US008539716B2

(12) United States Patent
Betker

(10) Patent No.: US 8,539,716 B2
(45) Date of Patent: Sep. 24, 2013

(54) TILT-UP DOOR

(75) Inventor: Roland W. Betker, St. Joseph, MI (US)

(73) Assignee: HP Doors, LLC, Benton Harbor, MI (US)

( * ) Notice: Subject to any disclaimer, the term of this patent is extended or adjusted under 35 U.S.C. 154(b) by 0 days.

(21) Appl. No.: 13/547,172

(22) Filed: Jul. 12, 2012

(65) Prior Publication Data

US 2012/0272577 A1 Nov. 1, 2012

Related U.S. Application Data

(63) Continuation of application No. 12/652,241, filed on Jan. 5, 2010, now Pat. No. 8,245,446.

(60) Provisional application No. 61/219,435, filed on Jun. 23, 2009.

(51) Int. Cl.
*B60J 5/10* (2006.01)

(52) U.S. Cl.
USPC .................................. 49/199; 49/201; 49/213

(58) Field of Classification Search
USPC .................. 49/197, 199, 200, 201, 202, 203, 49/204, 213
See application file for complete search history.

(56) References Cited

U.S. PATENT DOCUMENTS

| | | | | |
|---|---|---|---|---|
| 663,989 | A | | 12/1900 | Wilson |
| 1,709,278 | A | * | 4/1929 | Officer ........................... 160/92 |
| 1,970,222 | A | | 8/1934 | Byrne |
| 1,980,303 | A | | 11/1934 | Thompson |
| 2,080,693 | A | * | 5/1937 | Byrne ............................ 49/202 |
| 2,080,904 | A | | 5/1937 | Wanner |
| 2,163,394 | A | | 6/1939 | Clark |
| 2,222,151 | A | * | 11/1940 | Morgan ....................... 160/189 |
| 2,244,642 | A | | 6/1941 | Ferris et al. |
| 2,260,080 | A | | 10/1941 | Lane |
| 2,330,006 | A | | 9/1943 | Odenthal |
| 2,575,201 | A | | 11/1951 | Tillotson |
| 2,820,239 | A | | 1/1958 | Johannsen |
| 3,346,238 | A | * | 10/1967 | Dashio ........................... 256/24 |
| 3,468,060 | A | | 9/1969 | Mursinna |
| 3,913,266 | A | | 10/1975 | Smith |
| 4,727,792 | A | | 3/1988 | Haussler |
| 4,765,093 | A | | 8/1988 | Edwards, Jr. |
| 4,819,376 | A | | 4/1989 | Taddei |
| 5,239,776 | A | | 8/1993 | Lhotak |
| 5,373,663 | A | | 12/1994 | Turini |

(Continued)

FOREIGN PATENT DOCUMENTS

| | | |
|---|---|---|
| CA | 1329220 | 6/1989 |
| CH | 194711 A | 12/1937 |

(Continued)

*Primary Examiner* — Jerry Redman
(74) *Attorney, Agent, or Firm* — Robert L. Judd

(57) ABSTRACT

A tilt-up door for a building having an opening including a door frame with vertical track members, cam surfaces extending laterally from the vertical tracks at the upper portion of the tracks and a door sized to span the opening. The door can be pivotally coupled with rollers disposed within the vertical tracks and cam followers extending laterally from the upper portion of the door to contact the cam surfaces. When an upwardly directed motive force acts on the door the cam followers come into engagement with the cam surface to lift the door generally vertically and then rotate the door inwardly as the door is raised into an open raised position.

10 Claims, 22 Drawing Sheets

(56) References Cited

U.S. PATENT DOCUMENTS

| | | | | |
|---|---|---|---|---|
| 6,076,589 | A * | 6/2000 | Hormann | 160/201 |
| 6,883,273 | B2 | 4/2005 | Kerkvliet | |
| 7,219,711 | B2 | 5/2007 | Keller et al. | |
| D584,831 | S | 1/2009 | Parker | |
| 8,245,446 | B2 * | 8/2012 | Betker | 49/199 |
| 2002/0029524 | A1 | 3/2002 | Kerkvliet | |
| 2008/0086947 | A1 | 4/2008 | Crown | |
| 2010/0319258 | A1 * | 12/2010 | Betker | 49/199 |
| 2011/0232196 | A1 | 9/2011 | Robinson | |
| 2012/0272577 | A1 * | 11/2012 | Betker | 49/199 |

FOREIGN PATENT DOCUMENTS

| | | | |
|---|---|---|---|
| CH | 341304 | A | 9/1959 |
| CH | 671430 | A5 | 8/1989 |
| DE | 3809235 | A1 | 9/1989 |
| EP | 74502 | A1 * | 3/1983 |
| GB | 2220982 | A | 1/1990 |
| JP | 57015103 | A | 1/1982 |
| JP | 2003138836 | A | 5/2003 |

* cited by examiner

TILT-UP DOOR

CROSS-REFERENCE TO RELATED APPLICATIONS

This application is a continuation of U.S. patent application Ser. No. 12/652,241 filed on Jan. 5, 2010, now U.S. Pat. No. 8,245,446,issued Aug. 21, 2012. U.S. patent application Ser. No. 12/652,241 claims the benefit of U.S. Provisional Application No. 61/219,435 filed on Jun. 23, 2009.

BACKGROUND OF THE INVENTION

The invention relates to doors for large buildings such as airplane hangers, farm equipment storage buildings, marine storage buildings and heavy equipment storage buildings. Such buildings can have doors that pivot up to an open position to allow the stored equipment to be moved into or out of the building. For door openings wider than approximately 15' to 25' conventional sectional overhead doors are typically not used because of the span and the problem of preventing door panel sections from sagging in the middle as the door is opened. A single panel door can be provided with a truss to support the door to preclude sagging of the door in the open position.

BRIEF SUMMARY OF THE INVENTION

The invention relates to a tilt-up door system for a building having an opening including a door frame comprising a pair of vertically juxtaposed members defining a vertical track. The vertical members can have at least one first cam surface extending generally laterally from the vertical track at an upper portion thereof. The cam surface can have a first steep inclined segment, a second inclined segment and a third descending segment. A door sized to span the opening can be pivotally coupled to the vertical track with at least one roller disposed within the vertical track, and at least one cam follower extending laterally from an upper portion of the door in register with the at least one first cam surface. The door can be placed in alignment with the opening with the at least one roller disposed within the vertical track and the at least one cam follower located adjacent the at least one first cam surface. When an upwardly-directed motive force acts upon the door, the at least one cam follower can come into abutment with the first steep inclined segment of the at least one first cam surface which lifts the door generally vertically, then into the second inclined segment of the at least one first cam surface which rotates the upper portion of the door inwardly, and then against the third descending segment of the at least one first cam surface to bring the door into an opened, raised position The tilt-up door system can include a second cam surface that can be spaced beneath the first steep inclined segment that can include a second initial ramped segment whereby the cam follower can ride against the second initial ramped segment to prevent the door from unintentionally opening.

The tilt-up door system can a third cam surface that can be spaced beneath the third descending segment of the at least one first cam surface whereby the cam follower can be prevented from unintended oscillating movement with respect to the first cam surface.

The tilt-up door system can include a second cam surface that can be parallel to and vertically space beneath the first cam surface.

DESCRIPTION OF THE INVENTION

Tilt-up doors according to the invention can be used on storage buildings that can include, but are not limited to, aircraft hangers, farm equipment storage buildings, marine storage buildings and heavy equipment storage buildings requiring doors that are too wide for sectional overhead doors used on residential and commercial buildings. Typically sectional overhead doors can used for door openings up to 15' to 25' wide without requiring extra support for the door sections to prevent the door sections from sagging when the door is in the open position. Tilt-up doors are well known for storage buildings requiring door openings wider than 20' to 25' wide. The tilt-up door according to the invention includes an improved door lift arrangement.

Figure 1:
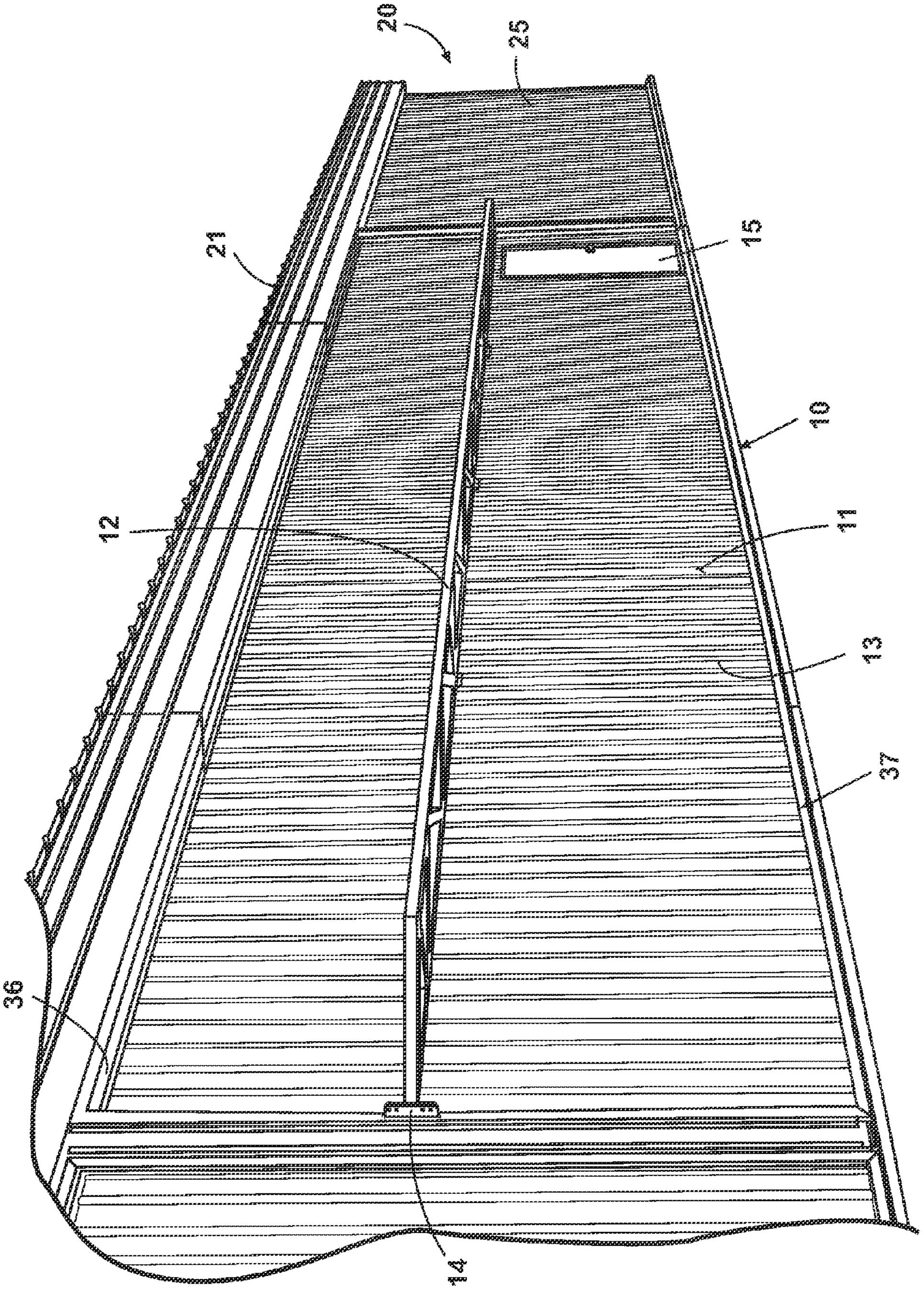
FIG. 1 is a perspective view of a tilt-up door according to the invention installed on an aircraft hanger building.
Figure 2:
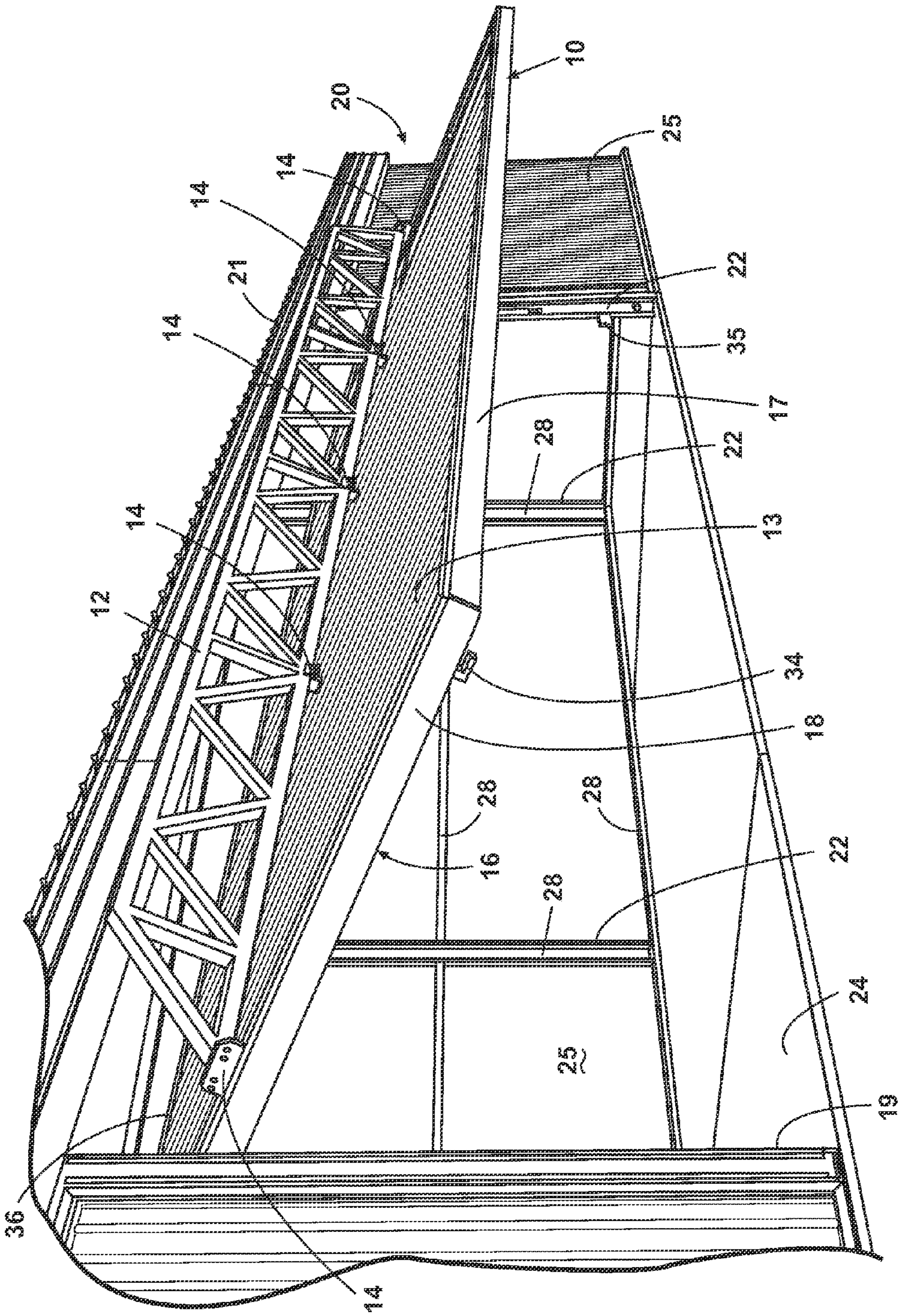
FIG. 2 is a perspective view of the tilt-up door shown in FIG. 1 partially opened.
Figure 3:
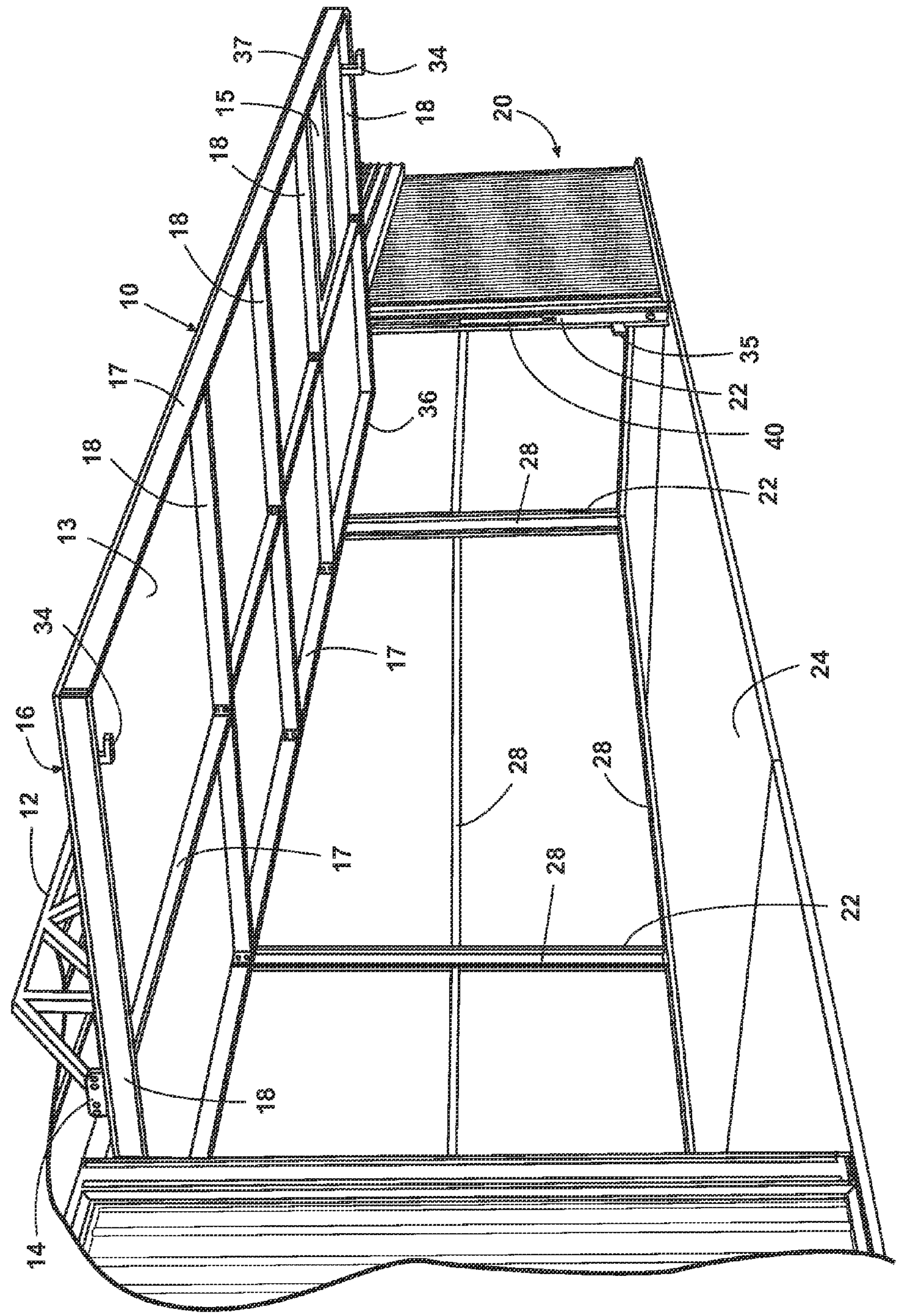
FIG. 3 is a perspective view of the tilt-up door shown in FIG. 1 fully opened.

Turning to FIGS. 1 to 3, a tilt-up door 10 can be seen pivotally mounted on a building 20 having a door opening 19 and a roof 21. The tilt-up door 10 can have a passage door 15 to permit individuals to enter the building 20 without opening tilt-up door 10. Tilt-up door 10 can include a truss 12 that can be mounted on the outside 11 of tilt-up door 10 above passage door 15. Tilt-up door 10 can have a frame 16 that can include horizontal members 17 and vertical members 18 that can be square or rectangular box members that can be fastened together into a frame 16 as is well known in the art. Truss 12 can be sized to provide the desired support for tilt-up door 10 to prevent sagging in the open position shown in FIG. 3 and to support the door for loads such as can be presented by rain, snow and wind conditions. Truss 12 can be attached to tilt-up door 10 with suitable mounting brackets 14 that can be attached to vertical members 18 of door frame 16 and can receive mounting bolts, not shown, to connect truss 12 to tilt-up door 10. Truss 12 can be mounted on tilt-up door 10 in a position where truss 12 will not interfere with building 20 when the tilt-up door 10 is in the open position as shown in FIG. 3. An advantage of mounting truss 12 generally in the vertical center portion of the door is that truss 12 is spaced above the floor and surface in front of building 20 and above a passage door 15 when a passage door is desired. In addition, truss 12 can be located near the pivot point for tilt-up door 10 as described below. Tilt-up door 10 can have door panels 13 attached to horizontal members 17 and additional vertical members 18 for frame 16. As desired door panels 13 can be selected to match panels used to enclose building 20. Door panels 13 can be typical door panels and can be insulated panels if desired as are well known. Truss 12 can be mounted to tilt-up door 10 after door panels 13 are attached to frame 16 to avoid inserting door panels 13 between truss 12 and frame 16.

Tilt-up door 10 according to the invention will be illustrated in combination with a steel frame aircraft hanger building although, as mentioned above, a tilt-up door according to the invention can be installed on other types of storage buildings including, but not limited to, wood frame pole barns, masonry buildings and open web truss buildings as desired. Building 20 can have a plurality of I-beams or columns 22 that can collectively form the framework 28 for building 20 and support roof 21. In the event the building framework 28 does not include I-beams a U-shaped channel that can be similar to U-shaped channel 32 can be employed adjacent the door opening. Building 20 can have walls 25 as desired to enclose building 20. Roof trusses 23, see FIG. 10, can be provided to support roof 21 as are well known. While I-beam trusses are shown in the drawings other roof support systems can be used as desired.

Figure 4:
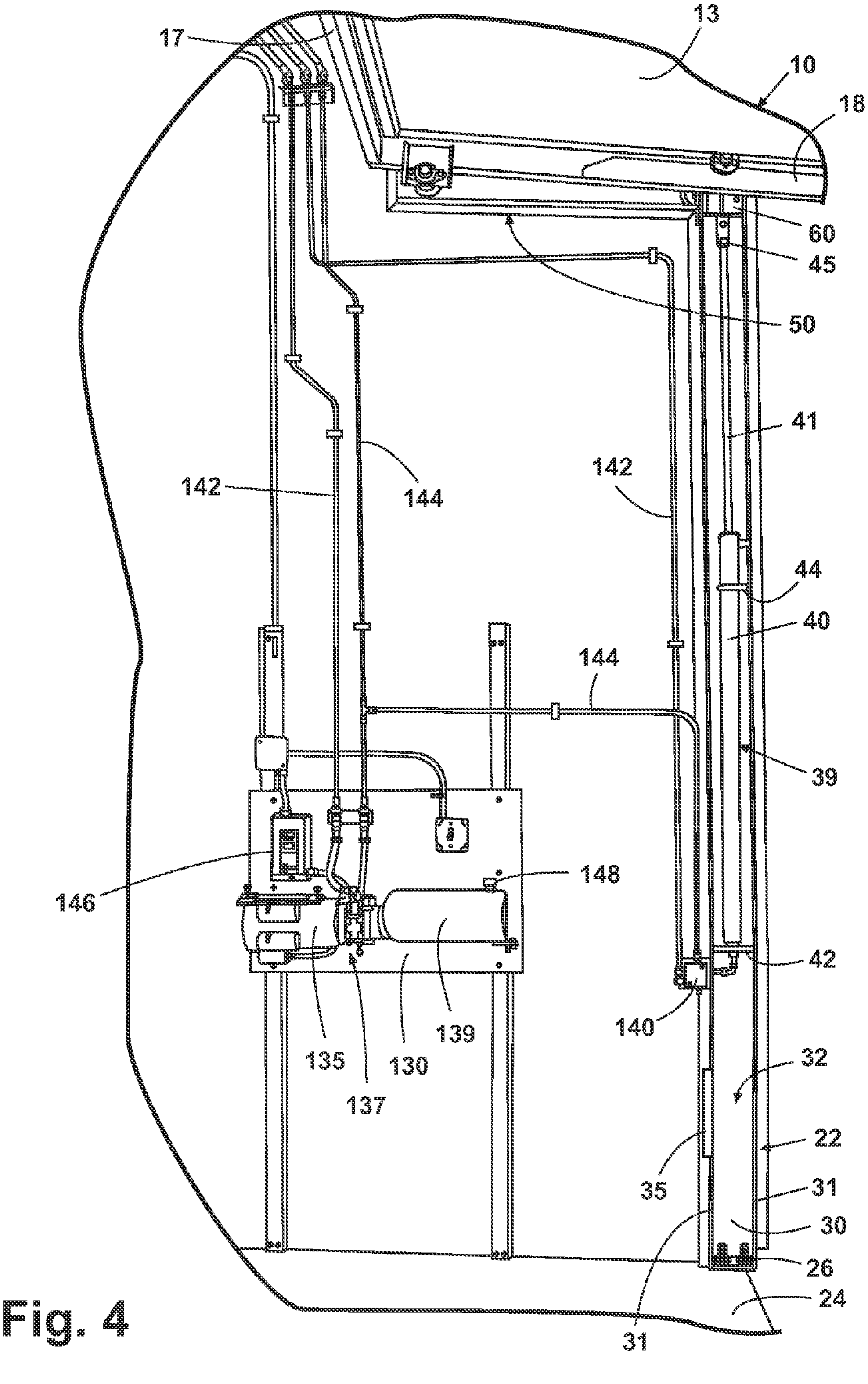
FIG. 4 is a view of the tilt-up door shown in FIG. 1 with the door fully open showing the door support and a hydraulic actuator operating mechanism.

As mentioned above, a tilt-up door 10 according to the invention can be pivotally mounted to building 20. Turning to FIG. 4, an I-beam 22 forming part of the building framework 28 at one side of door opening 19 can be seen. While the invention will be described employing an I-beam 22 those skilled in the will appreciate that other support columns can be used and can be provided with a U-shaped channel in lieu of an I-beam 22. A similar I-beam 22 or U-shaped channel can be provided on the other side of door opening 19 and the following description applies to an I-beam 22 and the pivotal mounting structure for tilt-up door 10 on both sides of door opening 19. I-beam 22 can be attached to floor 24 with a plurality of mounting bolts 26, or other suitable well known fasteners, and can be connected to the building framework 28 at the top of I-beam 22, not visible, as is well know. I-beam 22 can include a web 30 and a pair of flanges 31 that can form generally U-shaped channel 32. When a tilt-up door according to the invention is used with building structures that do not include I-beams, as discussed above, a U-shaped channel, not shown, can be mounted to the building support structure on each side of door opening 19 to provide a channel that can be similar to channel 32 shown in FIG. 4.

In one embodiment the actuator 39 for the tilt-up door 10 can be single acting hydraulic cylinders 40 that can be mounted in channel 32 on each side of door opening 19 to a support plate 42 that can be supported by web 30 and flanges 31. A double acting hydraulic cylinder can be used instead of a single acting hydraulic cylinder. When I-beam 22 is a steel beam, support plate 42 can be welded to web 30 and flanges 31. The hydraulic cylinders 40 can be secured in channels 32 with a bracket or clamp 44 that can be attached to I-beam 22 spaced from support plate 42 to secure hydraulic cylinder 40 in place. In FIG. 4 tilt-up door 10 is in the open position and piston 41 of hydraulic cylinder 40 is extended. The distal end 45 of piston 41 can be connected to a carriage or push block 60 that can be pivotally connected to door frame 16 as will be described below.

Figure 5:
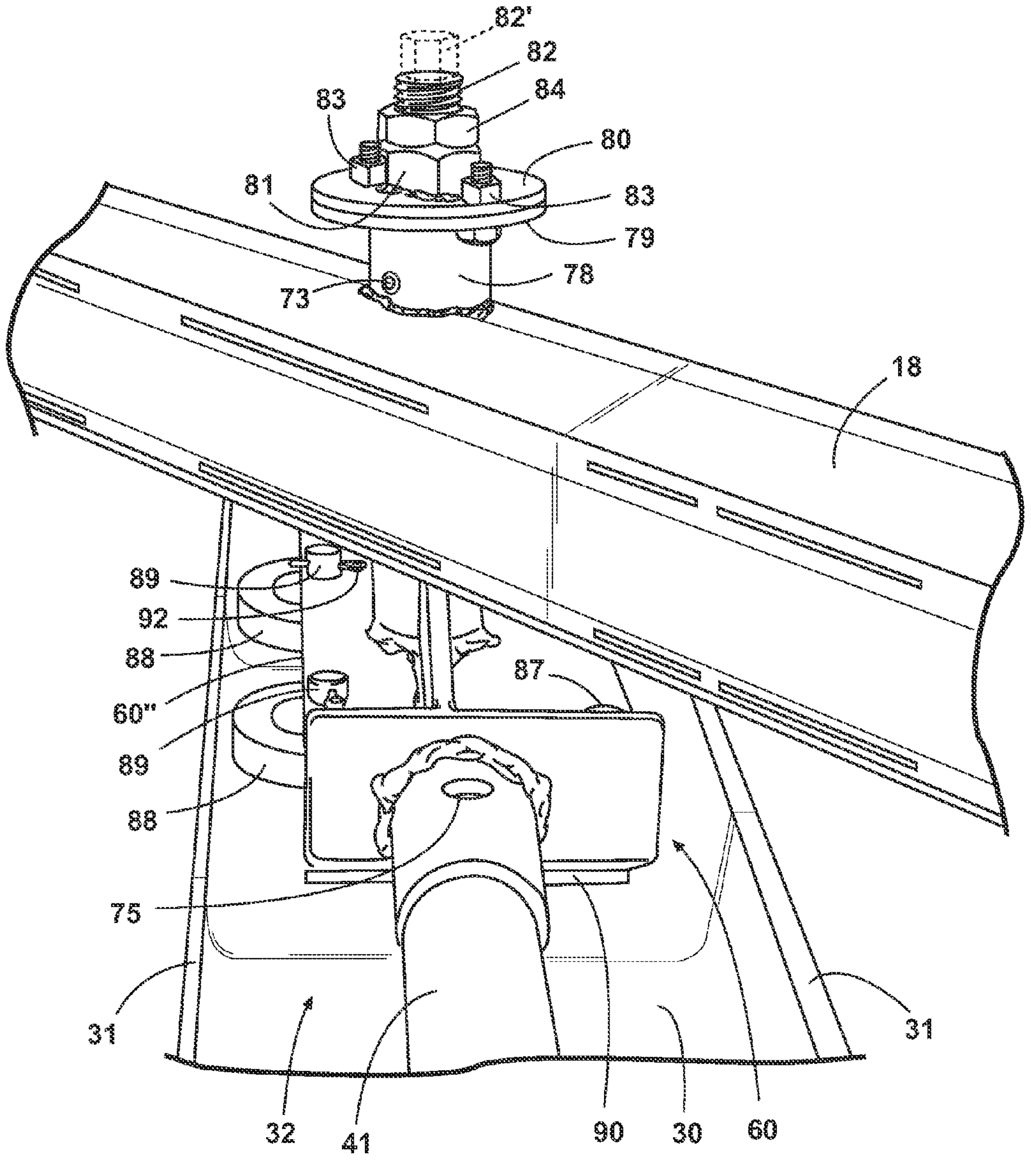
FIG. 5 is a partial view looking up showing a carriage in the U-shaped channel pivotally connected to the door frame.
Figure 8A:
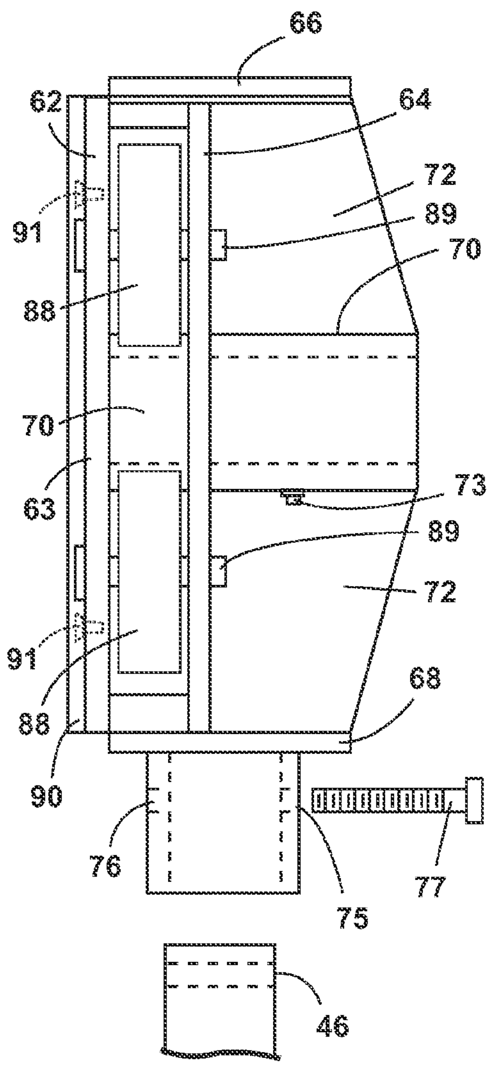
FIG. 8A is a side view of a carriage according to the invention.
Figure 8:
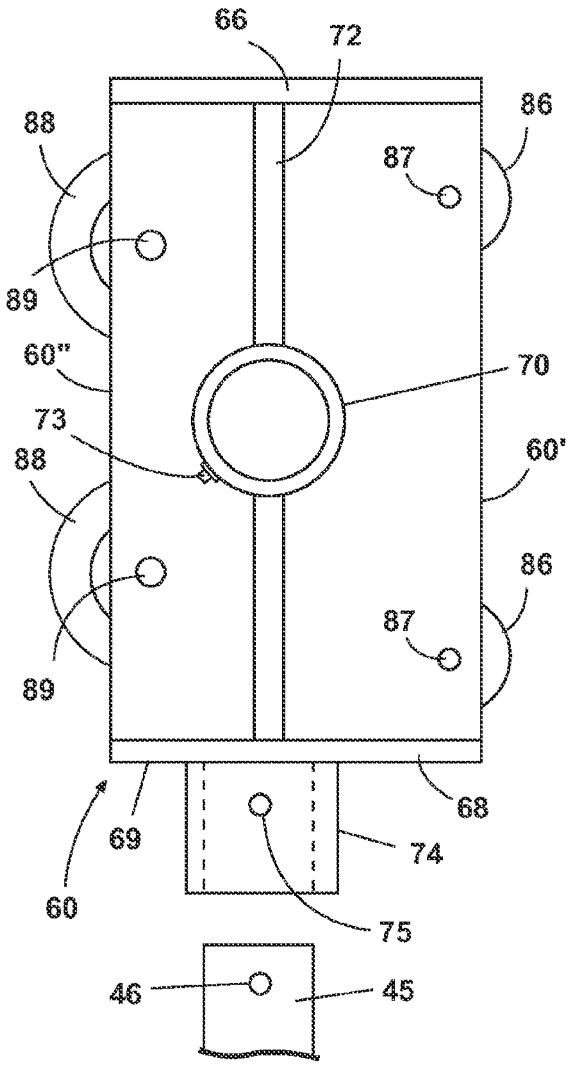
FIG. 8 is a top view of a carriage according to the invention.
Figure 13:
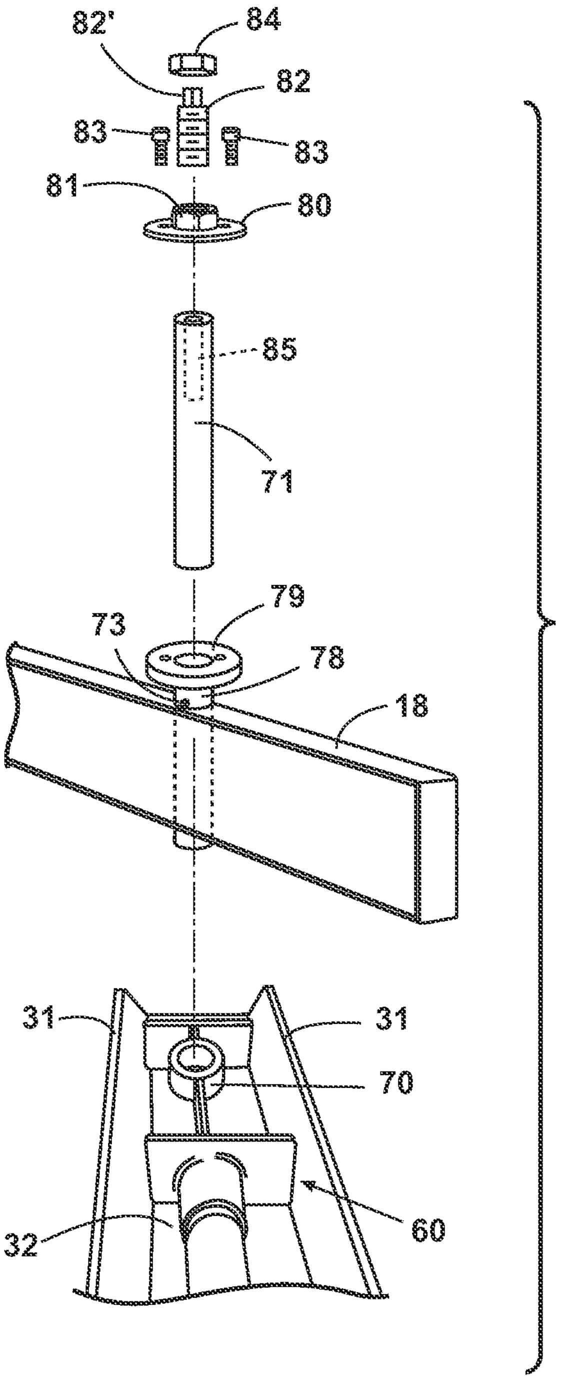
FIG. 13 is an exploded view of FIG. 5 illustrating the U-shaped channel, carriage, pivot shaft and door frame pivot shaft tube.

Turning to FIGS. 5, 8 and 13, one embodiment of a pivotal mounting arrangement for pivotally mounting tilt-up door 10 to the building 20 will be described. As noted above, the mounting structure of tilt-up door 10 can be the same on both sides of the tilt-up door 10 and door opening 19. Accordingly, while the tilt-up door 10 pivotal mounting arrangement on one side of tilt-up door 10 will be described in detail those skilled in the art should understand the following description applies to both sides of tilt-up door 10 and door opening 19 in building 20. In FIG. 5 carriage 60 can be seen in channel 32 with tilt-up door 10 in the partially open position. Referring to FIGS. 5, 8, and 13, carriage 60 can be formed by connecting plates 62 and 64 in spaced relationship with end plates 66 and 68. A horizontally extending pivot shaft journal 70 can be attached to carriage 60 by plates 62 and 64. Plates 62 and 64 can have an opening to receive pivot shaft journal 70 and pivot shaft journal 70 can be welded to plates 62 and 64 and end plates 66 and 68 can be welded to plates 62 and 64 to form carriage 60. Reinforcing plates 72 can be welded to pivot shaft journal 70 and end plates 66 and 68 to further support pivot shaft journal 70 relative to plates 62 and 64. Pivot shaft journal 70 can be a hollow cylinder to receive pivot shaft 71, see FIG. 13, to pivotally connect tilt-up door 10 to carriage 60. For example, pivot shaft 71 can be a 1" diameter solid rod. Those skilled in the art will understand that the diameter of pivot shaft 71 and the pivot shaft journal 70 can be smaller or larger depending on the size and weight of the tilt-up door 10. Likewise those skilled in the art will understand that carriage 60 can be formed in other ways to support a pivot shaft journal if desired. In addition, pivot shaft 71 can have a threaded hole 85 adjacent one end to facilitate removal of pivot shaft 71 if desired following installation. The end of pivot shaft journal 70 at plate 62 can have a plug, not shown, welded in pivot shaft journal 70 to close the end of pivot shaft journal 70 at the outer surface 63 of plate 62.

Vertical members 18 on both sides of door frame 16 can have a horizontally extending pivot shaft tube 78 that can be connected to vertical member 18 to rotatably support pivot shaft 71, see FIG. 13, to pivotally connect door 10 to carriage 60. Pivot shaft tube 78 can be welded in an opening in vertical member 18 at a desired location that can be generally in the vertical center portion of tilt-up door 10. The vertical position of pivot shaft tube 78 can be determined by the vertical height of door 10 and whether tilt-up door 10 includes a passage door 15 as illustrated in FIG. 1. When a passage door 15 is included in tilt-up door 10 pivot shaft tube 78 can be located above the top of passage door 15 in order to allow truss 12 to be located generally adjacent the pivot point of tilt-up door 10. Typically pivot shaft tube 78 can be located at least one quarter of the vertical height above the bottom edge 37 of the tilt-up door 10 and less than three quarters of the vertical height above the bottom edge of the tilt-up door 10. The location of pivot shaft tube 78, and accordingly the pivot point of tilt-up door 10 can be determined by the overall height of tilt-up door 10, whether a passage door 15 will be included and how much of tilt-up door 10 should extend from the face of the building 20 when the tilt-up door is in the open position which can determine the location of truss 12. It can be advantageous to locate the pivot point of tilt-up door 10 generally in the vertical center portion of the door, but, as noted above, the pivot point can be located as desired in the vertical center portion of the tilt-up door 10 to accommodate a passage door 15 and to allow vertical location of truss 12 generally adjacent to the pivot shaft tube 78. In the embodiment illustrated in FIGS. 1-3 the pivot shaft tube 78 can be located approximately ⅔ of the distance up from the bottom 37 of tilt-up door 10 to the top of tilt-up door 10.

Pivot shaft tube 78 can have a shaft tube closure 80 that can be mounted to a mounting ring 79 attached to the end of pivot shaft tube 78. Shaft tube closure 80 can be mounted to mounting ring 79 using suitable fasteners 83. Shaft tube closure 80 can have an adjusting bolt nut 81 attached to the external surface of shaft tube closure 80. An adjusting bolt 82 can be threaded into adjusting bolt nut 81 to bear against the end of pivot shaft 71 in shaft tube 78 to position door frame 16 relative to carriage 60 and accordingly I-beams 22 and building 20. By adjusting the adjusting bolts 82 on the opposite sides of tilt-up door 10 the tilt-up door 10 can be positioned side to side as desired in door opening 19 by adjusting the adjusting bolts 82. Adjusting bolts 82 can have a square or hex head 82' or can have a recessed socket to receive a tool to facilitate rotation of the respective adjusting bolts 82 on the opposite sides of tilt-up door 10 to position the tilt-up door 10 as desired. A lock nut 84 can be secured to each adjusting bolt 82 after the tilt-up door 10 is satisfactorily positioned in door opening 19 to lock adjusting bolts 82 in position. In order to adjust, or re-adjust, the side to side position of tilt-up door 10 in door opening 19 lock nuts 84 can be loosened and adjusting bolts 82 rotated to position the tilt-up door 10 in door opening 19 as desired and then lock nuts 84 can be retightened to secure the adjusting bolts 82 in the desired position. To remove pivot shaft 71, tilt-up door 10 can be partially opened to provide access to shaft tube cover 80 and tilt-up door 10 can be supported at the bottom edge 37 to remove weight from pivot shaft 71. Shaft tube cover 80 can be removed and a shaft puller can be threaded into threaded hole 85 to pull pivot shaft 71 from the pivot shaft tube 78. Pivot shaft 71 can be replaced and adjusted and the shaft tube cover can be replaced to complete any service of the pivot shaft and/or tilt-up door. Pivot shaft 71 can allow pivot shaft tube 78 to rotate relative to pivot shaft journal 70 as tilt-up door 10 is moved from the closed to the open position or from an open position to the closed position. Grease fittings 73 can be provided for pivot shaft journal 70 and pivot shaft tube 78 as shown on FIGS. 5, 8 and 13. Applicant has found that sleeve or other bearings are not required for pivot shaft 71 in pivot shaft journal 70 or pivot shaft tube 78 since the amount of relative rotation of pivot shaft 71 in pivot shaft journal 70 and pivot shaft tube 78 is relatively small in a door opening or closing cycle. If desired, suitable sleeve bearings could be used in addition to or instead of grease fittings to facilitate rotation of pivot shaft tube 78 relative to pivot shaft journal 70 on pivot shaft 71 as the tilt-up door 10 is opened and closed.

Carriage 60 end plate 68 can have a piston connector 74 attached to the outer surface 69 of end plate 68. Piston connector 74 can be arranged to receive the distal end 45 of piston 41 and a connector bolt 77, see FIGS. 8 and 8A. Distal end 45 can have a connector hole 46 bored transversely through the distal end 45. Connector 74 can have a connector bolt hole 75 on one side of connector 74 and tapped threads 76 on the opposite side of connector 74 to receive connector bolt 77 to secure carriage 60 to distal end 45 of piston 41. In the embodiment disclosed in FIGS. 4-8A a threaded connector bolt 77 is shown to secure carriage 60 to piston 41. Those skilled in the art will understand that other known fasteners such as a pin or a set screw or other fastener can be used to secure carriage 60 to the distal end 45 of piston 41 as desired.

Figure 6:
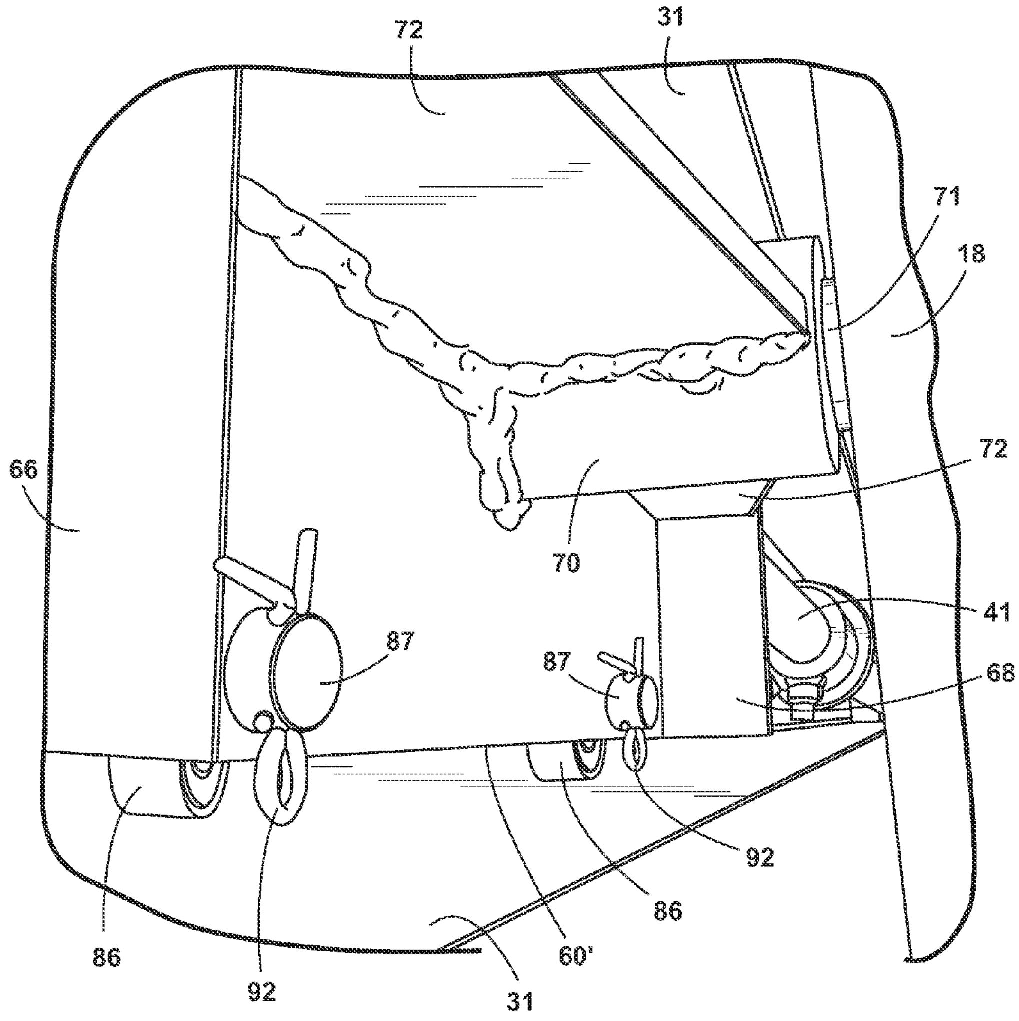
FIG. 6 is a partial view looking down showing the carriage in the U-shaped channel pivotally connected to the door frame.
Figure 7:
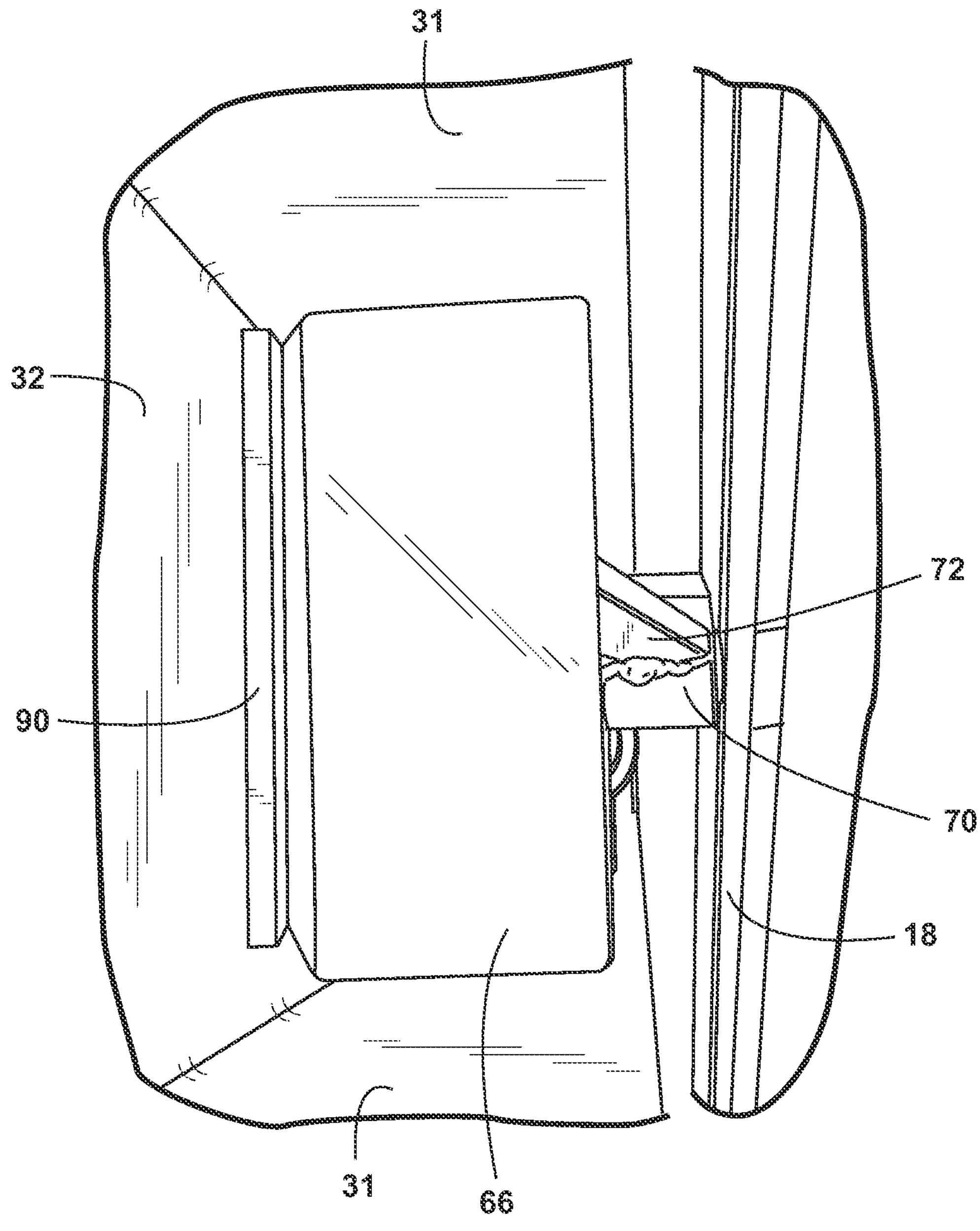
FIG. 7 is a partial view looking down showing the top of the carriage in the U-shaped channel pivotally connected to the door frame.

Referring to FIGS. 5, 6 and 7, carriage 60 can have a plurality of wheels that can facilitate movement of carriage 60 in channel 32 as tilt-up door 10 is opened and closed. Carriage 60 can have an exterior side 60', namely the side of carriage 60 that faces the outside of building 20 when carriage 60 is positioned in channel 32, and an interior side 60" that faces the interior of building 20. As tilt-up door 10 is opened by operating an actuator 39 such as hydraulic cylinder 40, carriage 60 is pushed upward in channel 32 by piston 41 pushing door frame 16 and, accordingly, tilt-up door 10 upward. Carriage 60 can have a pair of bearing wheels 86 rotatably mounted between plates 62 and 64 on bearing wheel shafts 87. As carriage 60 is pushed upward by hydraulic cylinder 40, carriage 60 is forced toward the exterior of building 20 due to the load of tilt-up door 10. Bearing wheels 86 can be steel bearings that can withstand the load of tilt-up door 10 thereby facilitating the movement of carriage 60 in channel 32. While steel bearing wheels can be used as illustrated in the embodiment of FIGS. 4-8, those skilled in the art will understand that other wheels designed to support the anticipated load of a tilt-up door 10 can be used. Carriage 60 can also have a pair of idler wheels 88 rotatably mounted between plates 62 and 64 on the interior side 60" of carriage 60 on idler wheel shafts 89. Bearing wheel shafts 87 and idler wheel shafts 89 can be attached to carriage 60 utilizing cotter keys 92 as shown in FIGS. 5 and 6 or other well know shaft retainers as desired. Idler wheels 88 can be urethane wheels since, normally, idler wheels 88 are not in contact with flange 31 on the inside of building 20. Idler wheels 88 can help assure that carriage 60 remains generally centered in channel 32 during opening or closing of tilt-up door 10. Carriage 60 can also have a low friction pad 90 positioned on the outer surface 63 of plate 62 to facilitate movement of carriage 60 along web 30 in channel 32 as tilt-up door 10 is opened and closed. Low friction pad 90 can be a well known plastic resin material such as nylon or Delrin®. Those skilled in the art will understand that other low friction materials can be used for low friction pad 90. A low friction pad such as low friction pad 90 can be attached to plate 62 with a plurality of countersunk flat head machine screws 91 that can be threaded into tapped holes in plate 62. Those skilled in the art will understand that the number of screws required to secure low friction pad 90 to plate 62 depends on the size of low friction pad 90. Typically 4 to 6 screws 91 can be used to secure low friction pad 90 to plate 62.

In addition to the pivotal mounting of tilt-up door 10 to building 20 described above, the tilt-up door mounting arrangement can include a track 50 that can be attached to I-beam 22 adjacent the top end of I-beam 22 on each side of door opening 19. Referring to FIGS. 1 and 9-11, the first end 48 of track 50 can be connected to I-beam 22 and roof truss 23 adjacent the top of I-beam 22. Track 50 can be a C-section steel beam having a bottom flange 51 and a top flange 52 in addition to a mounting flange 53 to facilitate attachment of track 50 to I-beam 22. Top flange 52 can be attached to roof truss 23 to connect track 50 to the building structure. While the building 20 illustrated in the drawings includes roof trusses 23, those skilled in the art will understand that other building trusses can be used to secure track 50 in place at the top of I-beam 22. In addition, as described below in connection with FIG. 12, a tilt-up door according to the invention can be used in combination with buildings that to not have trusses or other supports positioned above track 50. The length of track 50 can be determined based on the overall height of tilt-up door 10 and the pivot point that determine how far tilt-up door 10 will extend into building 20 when tilt-up door 10 is in the open position as shown in FIG. 3. Those with ordinary skill in the art will understand that track 50 can be a beam having a configuration other than a C-section as desired.

Track 50 can include a cam surface 55. Door frame 16 can have a horizontally extending cam follower 95 positioned adjacent to top edge 36 of tilt-up door 10. Cam follower 95 can include a mounting bracket 96 that can be connected to vertical member 18 of door frame 16 adjacent to the top horizontal member 17. Mounting bracket 96 can be welded to vertical member 18 and can be arranged to support flange bearings 98 on opposite faces 97 of mounting bracket 96. Flange bearings 98 can be secured to mounting bracket 96 with fasteners 99 and can include grease fittings 73. Cam follower 95 can further include a cam follower shaft 102 that can be rotatably supported by flange bearings 98 on opposite sides of mounting bracket 96 and shaft 102 can extend outwardly from door frame 16 to rotatably support cam follower wheel 104. Cam follower wheel 104 can be an enlarged end of shaft 102 and can have a relatively hard urethane surface formed on the enlarged end of shaft 102. As can be seen best in FIG. 11 cam follower wheel 104 can engage cam surface 55 as tilt-up door 10 moves from the closed position, shown in FIG. 10, to the open position shown in FIG. 11. When the pivot point of tilt-up door 10 is above the vertical center of tilt-up door 10, cam follower wheel 104 can be biased into contact with cam surface 55 by the unbalanced weight of tilt-up door 10 with respect to the pivot point about pivot shaft 71. Accordingly, as an actuator 39 such as hydraulic cylinders 40 are operated, carriages 60 are forced upward by pistons 41 thus pushing tilt-up door 10 upward as pivot shaft tubes 78 attached to door frame 16 are forced upward. As door frame 16 moves upward the top edge 36 of tilt-up door 10 rotates inward as cam follower wheels 104 roll along cam surfaces 55. As tilt-up door 10 moves upward, tilt-up door 10 rotates approximately 90° as shown in FIGS. 2 and 3. Thus, tilt-up door 10 has a moving pivot point, pivot shaft 71 in pivot shaft tubes 78, moving along a substantially straight line (carriages 60 and pivot shaft journals 70 move in substantially vertical channels 32), about which tilt-up door 10 rotates as it is moved upward. Cams 55 can be arranged to rotate tilt-up door 10 from the vertical position in FIG. 1 to a generally horizontal position as shown in FIG. 3 as hydraulic cylinders 40 lift tilt-up door 10 from the closed position in FIG. 1 to the open position in FIG. 3.

Figure 3A:
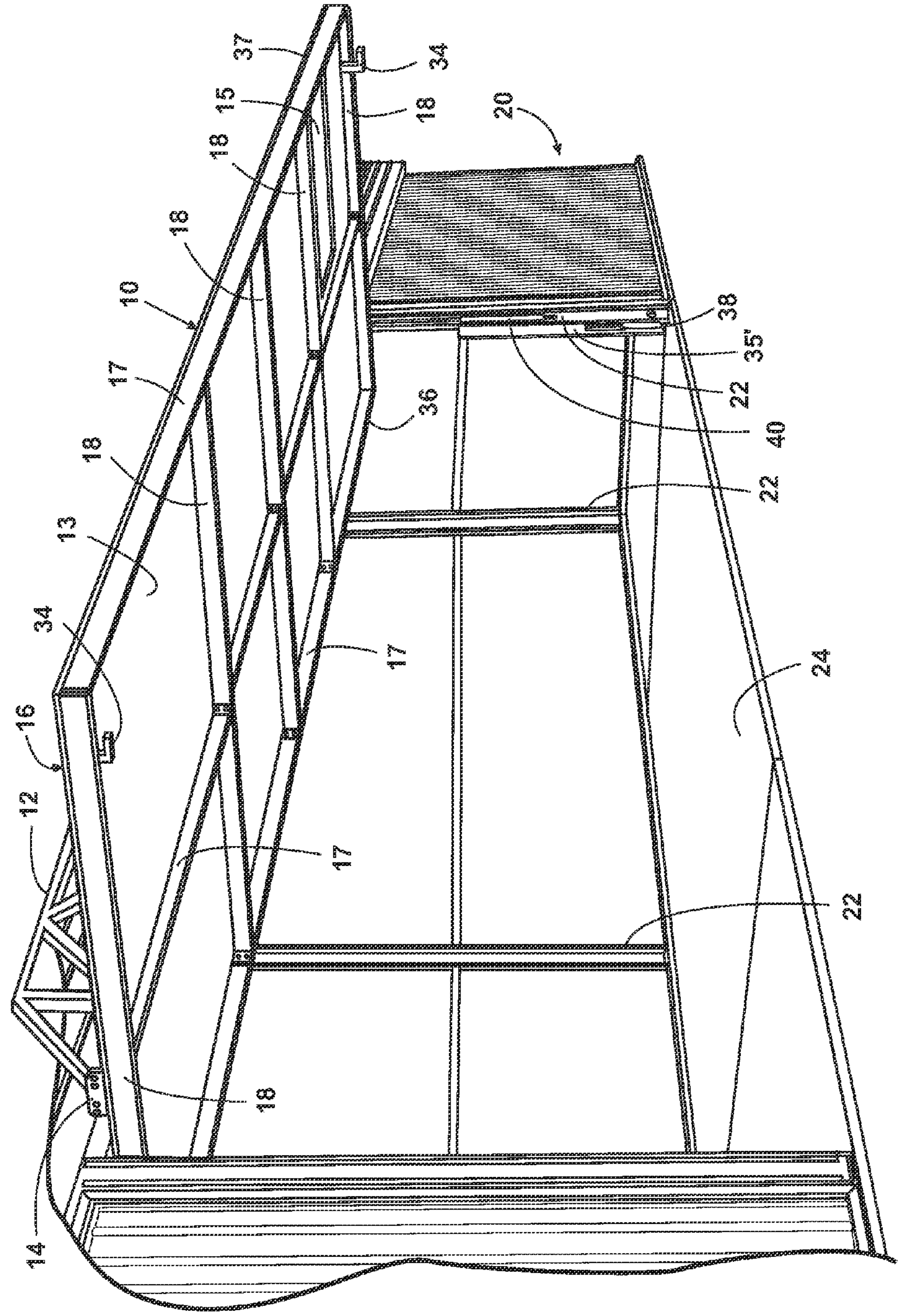
FIG. 3A is a perspective view of the tilt-up door shown in FIG. 3 showing an alternate door stop arrangement.
Figure 10:
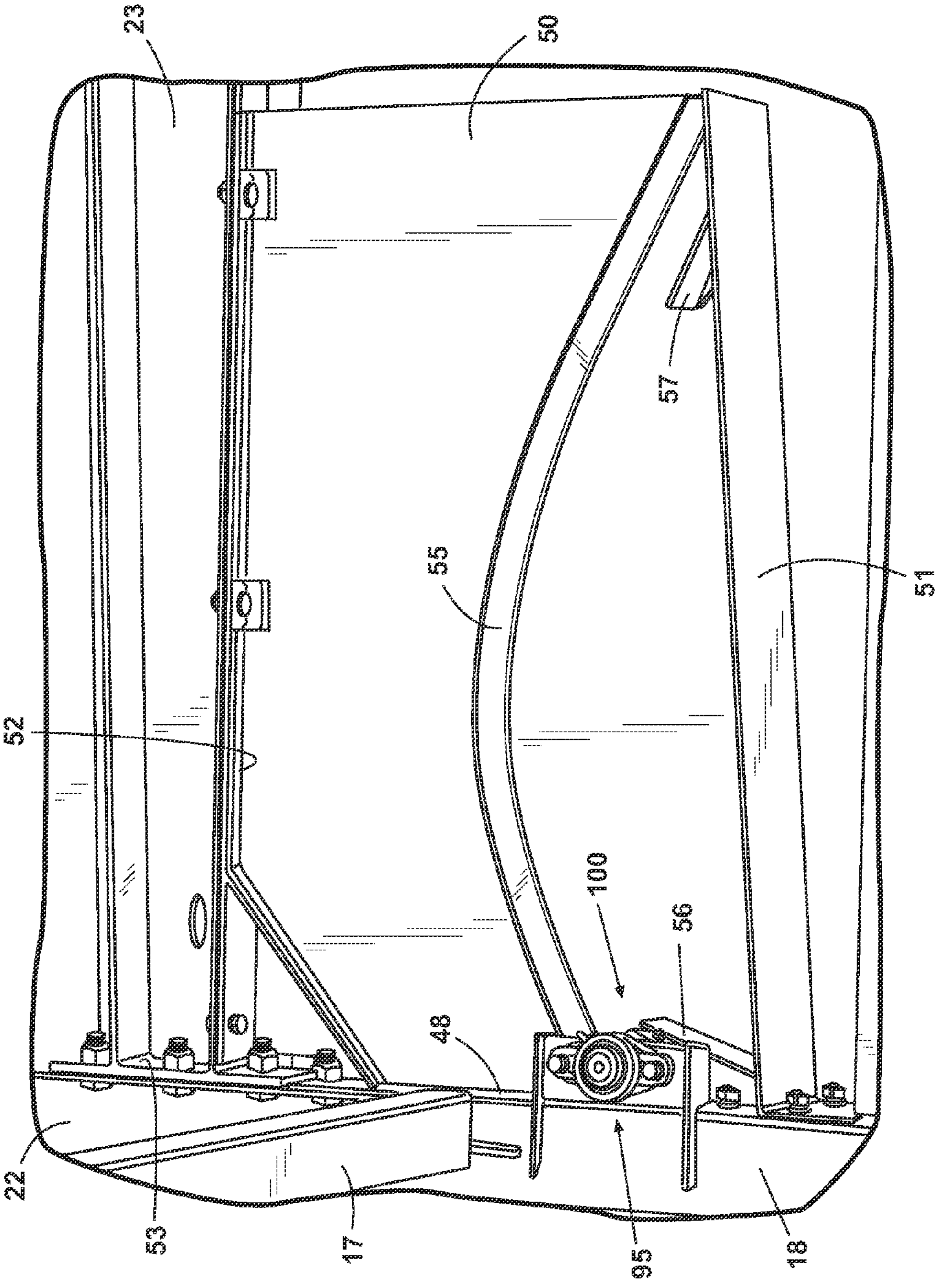
FIG. 10 is a partial view showing the track and cam surface with the cam follower engaging the cam surface with the tilt-up door in the closed position.

Referring to FIG. 10, as tilt-up door 10 approaches the closed position cam surface 55 becomes substantially vertical adjacent the first end 48 of track 50 so that tilt-up door 10 initially moves generally vertically for the first few inches from closed position as tilt-up door 10 opens and moves generally vertically over the last few inches to the closed position as tilt-up door 10 closes. An advantage of generally vertical movement from and to the closed position is that material lying against the outside surface of tilt-up door 10 such as snow or ice does not need to be moved by the door opening mechanism as tilt-up door 10 initially rises vertically. An additional advantage of vertical movement at the beginning of an opening cycle and the end of a closing cycle is that a mechanical latch arrangement can be employed to secure the bottom edge 37 of tilt-up door 10 in the closed position. One mechanical latch arrangement can be seen in FIGS. 2 and 3 and can include hooks 34 that can be attached to vertical members 18 on the outside edges of door frame 16 spaced above the bottom edge 37 extending inward from door frame 16. Tabs 35 can be attached to I-beams 22 on opposite sides of door opening 19 extending into door opening 19 and positioned to be engaged by hooks 34 as tilt-up door 10 moves to the closed position shown in FIG. 1. Hooks 34 and tabs 35 can be dimensioned and positioned so that hooks 34 engage/disengage tabs 35 as tilt-up door 10 moves generally vertically to the closed position/from the closed positioned as described above. In addition, tabs 35 can prevent over swing of tilt-up door 10 past the closed position during closing and provide a secure stop for tilt-up door 10 in the event of wind pressure and the like. Referring to FIG. 3A, extended tabs 35' can be provided to extend along I-beam 22 from adjacent the floor 24 to a position adjacent the top of hydraulic cylinder 40 to provide an extended door stop and to provide an improved door seal. An improved door seal arrangement can be desirable for applications in climates where climate control of the interior of building 20 may be desired. Extended tabs 35' can have a slot 38 to allow hook 34 to engage tab 35' as described above.

Figure 10A:
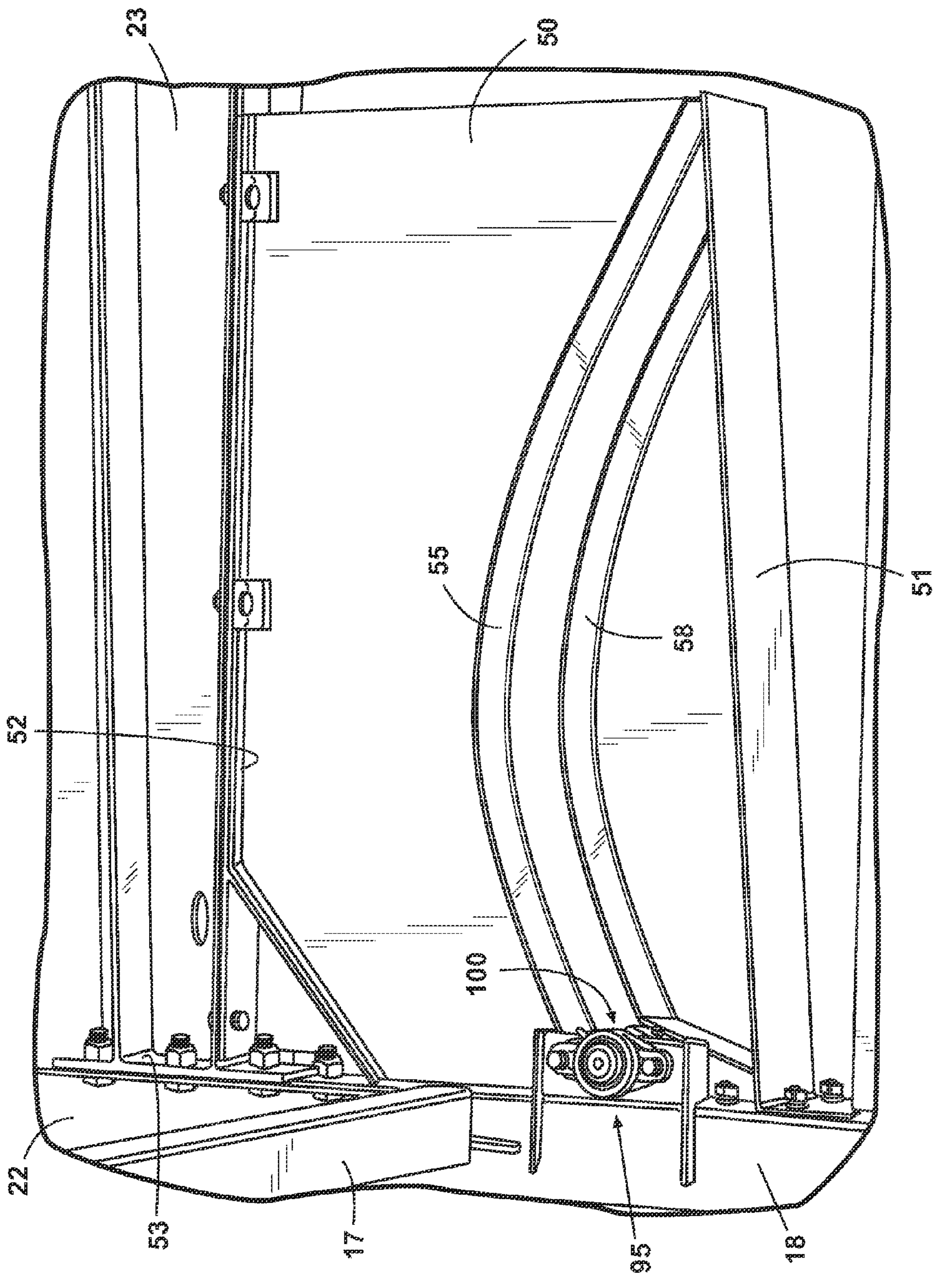
FIG. 10A is a partial view showing an alternate track and cam surface with the cam follower engaging the cam surface with the tilt-up door in the closed position.
Figure 11:
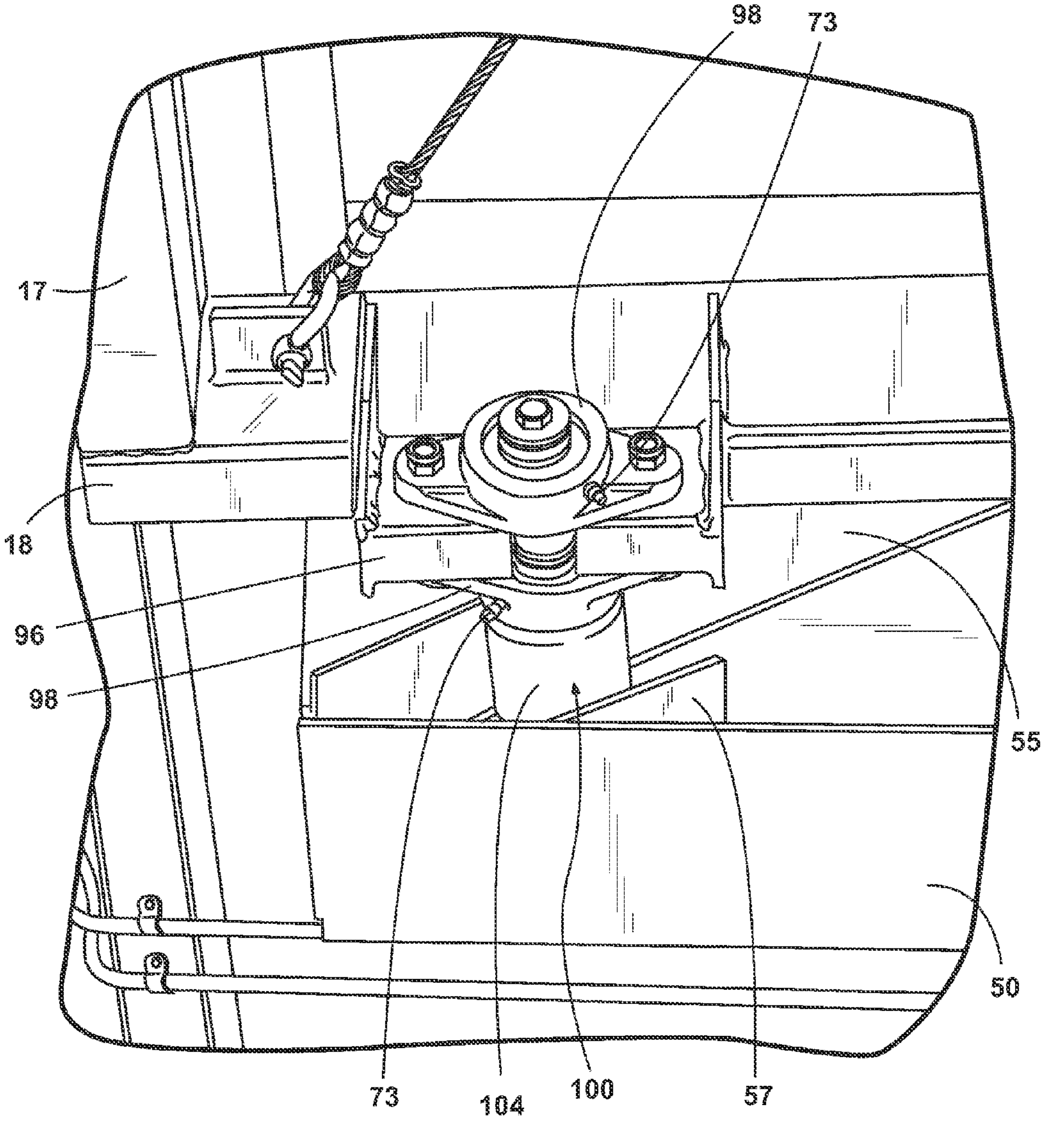
FIG. 11 is a partial view showing the cam follower engaging the cam surface with the tilt-up door in the open position.

Referring again to FIGS. 10 and 11, track 50 can include additional cam surfaces that can restrain cam follower wheel 104 as tilt-up door 10 approaches the open position adjacent the second end 49 of track 50, FIG. 11, and the closed position adjacent the first end 48 of track 50, FIG. 10. A closed cam follower surface 56 can be provided on track 50 beneath cam surface 55 that can prevent cam follower wheel from moving out of contact with cam surface 55 allowing tilt-up door 10 to lift and rotate cam follower wheel 104 out of contact with cam surface 55 such as might occur in a high wind condition before tilt-up door 10 is open enough to provide sufficient cantilever load to hold cam follower wheel 104 in contact with cam surface 55. An open cam follower surface 57 can be provided to engage cam follower wheel 104 as tilt-up door 10 approaches the open position adjacent the second end 49 of track 50, FIGS. 3 and 11. By engaging cam follower wheel 104, open cam surface 57 can help prevent tilt-up door 10 from bouncing up and down when substantially open as might otherwise occur in high wind conditions. Alternately as illustrated in FIG. 10A, track 50 can have secondary cam surface 58 positioned below and generally parallel to cam surface 55 to assure that cam follower wheel 104 remains generally in contact with cam surface 55 or secondary cam surface 58 as cam follower wheel 104 moves from the first end 48 to the second end 49 of track 50. A secondary cam surface 58 can be used when the pivot point of tilt-up door 10 is near or below the vertical mid-point of tilt-up door to preclude the cam follower wheel 104 from dropping out of contact with cam surface 57 due to a nearly balanced tilt-up door 10 about the pivot point or unbalanced weight of tilt-up door 10 above the pivot point. Secondary cam surface 58 can be vertically spaced from cam surface 55 sufficiently to allow cam follower wheel 104 roll freely along cam surface 55 and or secondary cam surface 58. Thus, in the embodiment illustrated in FIG. 10A, cam surface 55 and secondary cam surface 58 can form a track or channel for cam follower wheel 104 that can prevent the cam follower wheel 104 from losing contact with the cam surface 55 and/or secondary cam surface 58 regardless of the vertical location of the pivot point of tilt-up door 10 or adverse weather conditions.

Figure 12:
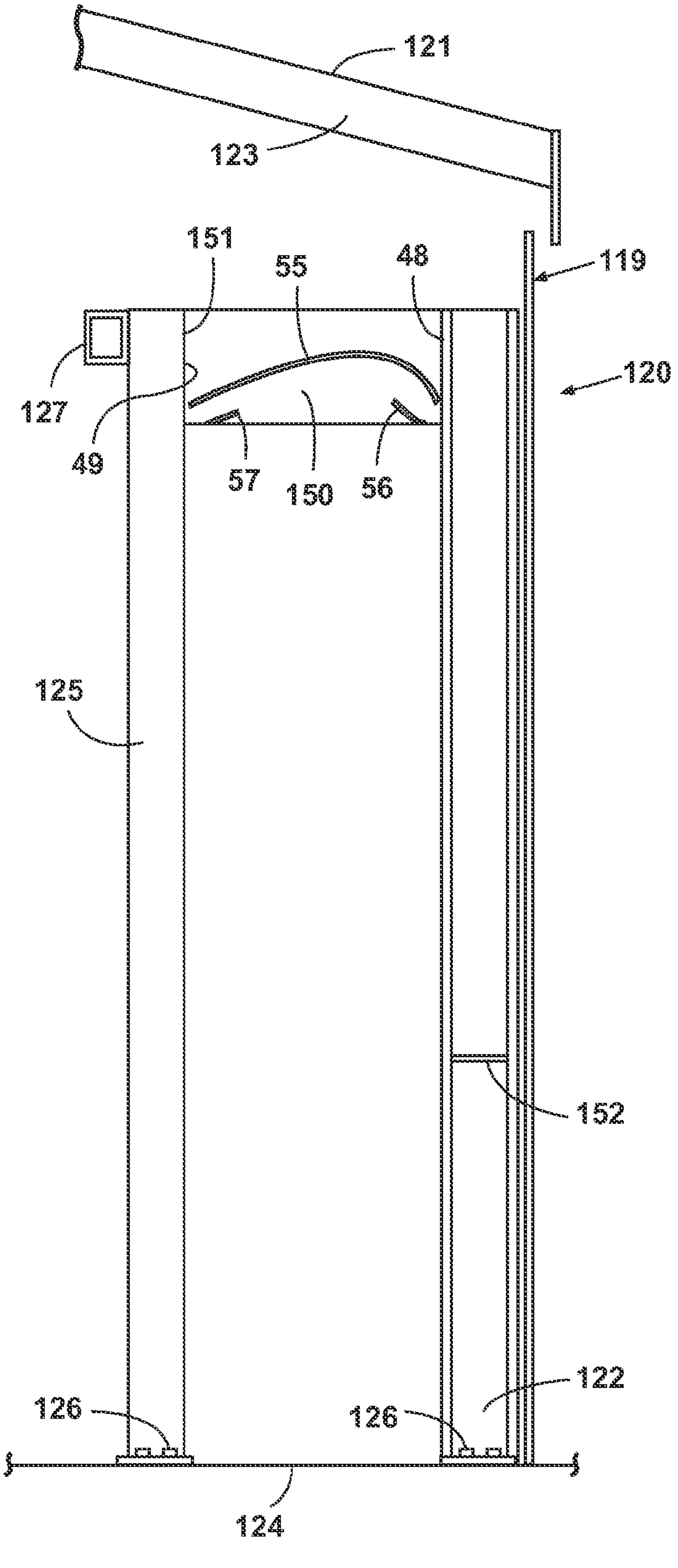
FIG. 12 is a schematic view illustrating an alternate U-shaped channel and track arrangement according to the invention.

As noted above, a tilt-up door according to the invention can be used in combination with storage buildings that do not have a building truss spanning the building adjacent to top of the door opening. Turning to FIG. 12, an alternate I-beam and track arrangement can be seen in schematic form. Building 120 can have a roof 121 supported by roof trusses 123 that do not extend horizontally at the top of door opening 119. I-beam 122 can be similar to I-beam 22 in the embodiment of FIGS. 1-11 and 13 and can include a hydraulic cylinder and carriage mechanism as described above but not shown in FIG. 12. I-beam 122 can have a support plate 152 that can be similar to support plate 42 as illustrated in FIG. 4 and can support an actuator 39 or a hydraulic cylinder, not shown in FIG. 12 that can be similar to hydraulic cylinder 40 as illustrated in FIG. 4. Track 150 can be attached to I-beam 122 as described above in the embodiment of FIGS. 1-11 and 13. In absence of a building truss or beam to secure track 150 to, as in the embodiment described above, a support tube 125 can be provided to support the end 151 of track 150 opposite I-beam 122. Support tube 125 can be a square or rectangular tube, or could be an I-beam as desired, and can be attached to the floor 124 with mounting bolts 126 or other fasteners in a manner similar to I-beam 22. As above, an I-beam 122, track 150 and support tube 125 can be provided on each side of door opening 119. In addition, a spreader 127 can be provided to connect support tubes 125 on opposite sides of door opening 119 to prevent tracks 150 from moving horizontally apart in operation since tracks 150 are not attached to the building structure adjacent to the inner end 151 as in the embodiment of FIGS. 1-11 and 13 described above. The alternate I-beam and track arrangement described above can also be used with the alternate pivotal mounting arrangements and operating mechanisms described below.

Figure 14:
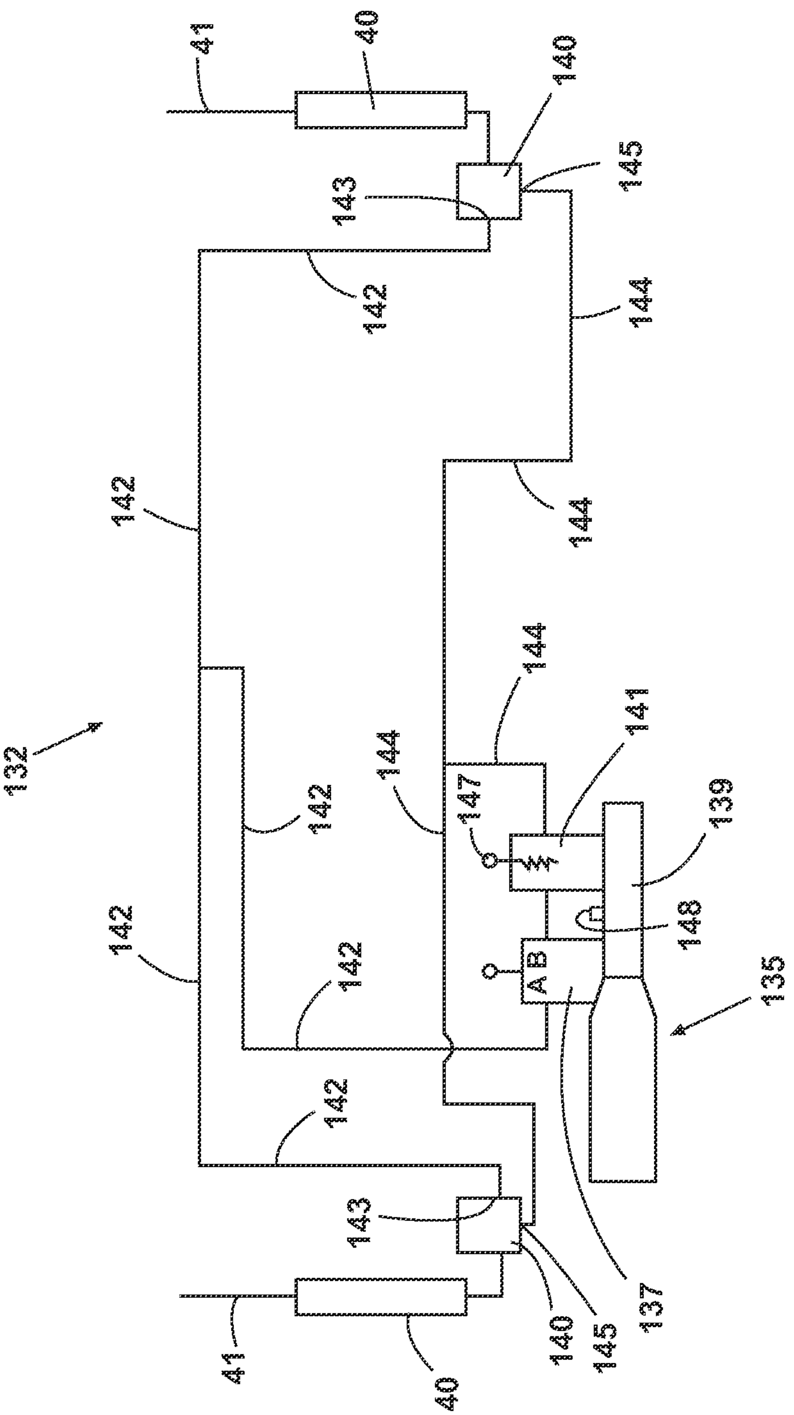
FIG. 14 is a schematic drawing of a hydraulic circuit that can be used with a tilt-up door according to the invention.

Turning to FIGS. 4 and 14 a hydraulic circuit 132 for supplying hydraulic cylinders 40 when the tilt-up door actuator 39 consists of one or more hydraulic cylinders will be described. A control panel 130 can be provided to support controls and hydraulic circuit components. While control panel 130 is shown adjacent door opening 19 in FIG. 4 those skilled in the art will understand control panel can be located at other positions in building 20 or mounted to columns or I-beams as desired. A pump and motor 135 can be mounted on control panel 130 adjacent a spool valve 137 and a hydraulic fluid tank 139. Hydraulic fluid tank 139 can be sized to hold sufficient hydraulic fluid for the hydraulic circuit 132 and to allow for expansion of the hydraulic fluid under warm weather temperature conditions without overflowing. As illustrated in FIG. 4, tank 139 can include a vent 148 to the atmosphere. While pump and motor 135, spool valve 137 and relief valve 141 are illustrated as a single or combined component those skilled in the art will understand that a separate pump and motor, spool valve and relief valve can be employed if desired. Supply lines 142 can connect the "A" side of spool valve 137 to the supply port 143 of a holding valve 140 adjacent to each hydraulic cylinder 40. In the FIGS. 16 and 17A embodiments a single linear actuator 39 can be a hydraulic cylinder that can be connected in a hydraulic circuit that can be similar to the hydraulic circuit illustrated in FIG. 14 but having a single hydraulic cylinder. In the FIGS. 16 and 17A embodiments a suitable control panel, not shown, can be similar to control panel 130 and can be located in a suitable location in building 20. In the case of the FIG. 17A embodiment a control panel that can be similar to control panel 130 but not shown in FIG. 17A, can be located adjacent I-beam 206 if desired to minimize the length of the hydraulic lines required to connect the hydraulic cylinder to the control panel. In the embodiments described in connection with FIGS. 1-11, 14, 16 and 17A, holding valves 140 can be a well known holding valve such as a Gresen Holding Valve model MHB-015-LEAE-51E-00. While holding valves 140 and hydraulic cylinders 40 are illustrated as separate components, those skilled in the art will understand that a suitable holding valve can be incorporated in the hydraulic cylinder within the scope of the invention. Supply lines 142 can be arranged to supply the hydraulic cylinders 40 from a center point, when more than one hydraulic cylinder is employed, so that length of the supply lines 142 from spool valve 137 to supply ports 143 of holding valves 140 to hydraulic cylinder 40 for each of the hydraulic cylinders 40 can be equal. Supply lines 142 can be ½" steel lines. Release lines 144 can connect the "B" side of spool valve 137 through "B" port relief valve 141 to the release port 145 of holding valves 140. Release lines 144 can be ⅜" steel lines. Whenever hydraulic cylinders 40 are partially or fully extended by operation of pump and motor 135 and actuation of spool valve 137, holding valves 140 prevent reverse flow from hydraulic cylinders 40 and thereby prevent pistons 141 from retracting regardless of whether pump and motor 135 are operating, or even if one or more of supply lines 142 is opened or damaged leading to loss of hydraulic fluid from the supply lines 142.

In order to retract pistons 141 and lower tilt-up door 10, pump and motor 135 can be restarted and spool valve 137 can be moved to the "B" position to pressurize release ports 145 on holding valves 140 to allow reverse flow of hydraulic fluid from hydraulic cylinders 40 back to tank 139 and thereby allow pistons 141 to retract into hydraulic cylinders 40. "B" port relief valve 141 can be provided to reduce the fluid pressure in the release lines 144 from the supply lines 142 pressure since the pressure applied to release ports 145 can determine the reverse flow rate through holding valves 140, and thus can determine the closure rate for tilt-up door 10. For example, the pressure in supply lines 142 applied to the hydraulic cylinders 40 can be in the range of 1,200 to 1,500 psi, the pressure applied to release ports 145 can be on the order of 500-800 psi. Those skilled in the art will understand that the supply lines pressure and release lines pressure can be higher or lower than the pressures mentioned above as an example depending on the application and components used in the hydraulic circuit. "B" port relief valve 141 can be adjustable to allow the user to select and set the pressure in the release lines that can be applied to release ports 145. "B" port relief valve 141 can have an adjustment screw 147 that can have a jam nut to secure adjustment screw 147 when the release line pressure has been adjusted to provide the desired descent rate for tilt-up door 10. Since release lines 144 supply pressure to release ports 145 without flow of hydraulic fluid through release lines 144 the length of release lines 144 to release ports 145 of holding valves 140 do not need to be equal as can be the case of supply lines 142. While a manually controlled spool valve is illustrated in FIGS. 4 and 14, those skilled in the art will understand that electrically or electronically controlled spool valves can be used to control operation of hydraulic cylinders 40 if desired. An electrical circuit breaker box 146 can be mounted on control panel 130 if desired to provide power to pump motor 135 and any other electrical components mounted on or powered through control panel 130. The embodiments illustrated in FIG. 16 when the linear actuator 39 is a hydraulic cylinder and FIG. 17A can similarly be provided with controls for the hydraulic circuit. When the linear actuator is other than a hydraulic cylinder a control panel similar to control panel 130 can be provided for the control devices for the linear actuator.

Figure 8C:
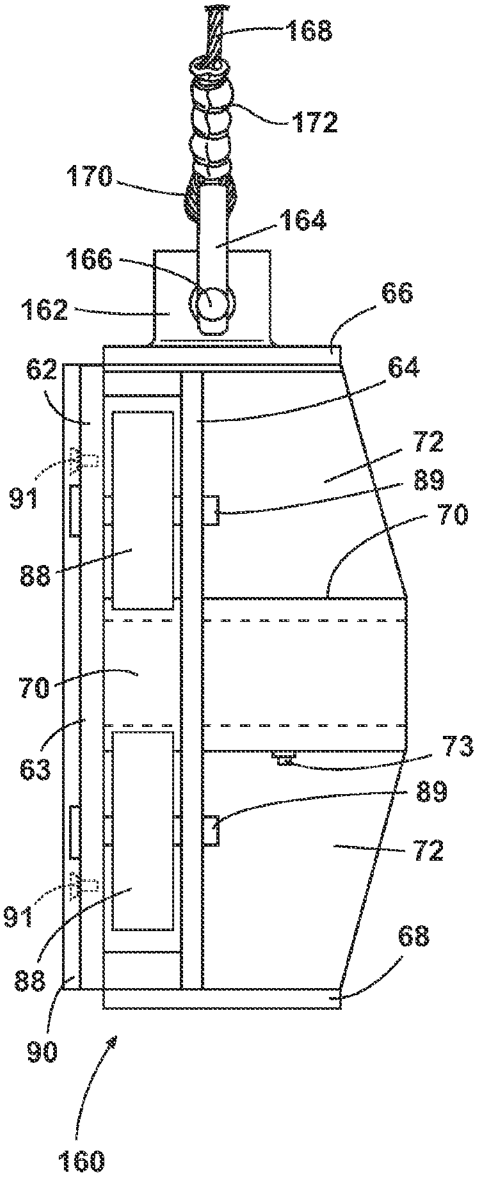
FIG. 8C is a side view of the alternate carriage of FIG. 8B.
Figure 8B:
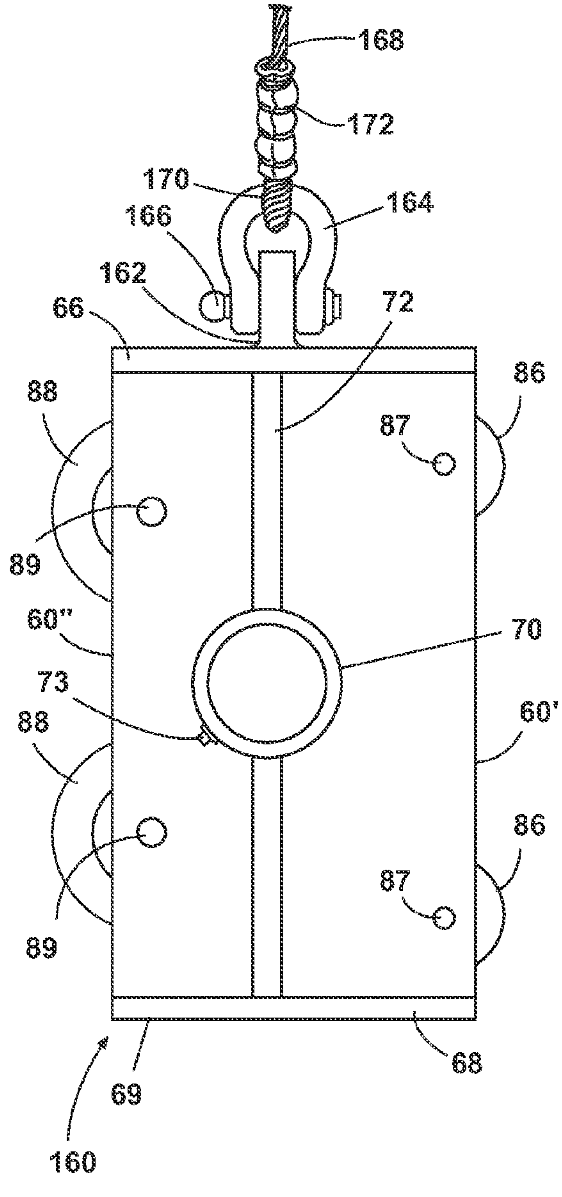
FIG. 8B is a top view of an alternate carriage according to the invention
Figure 8E:
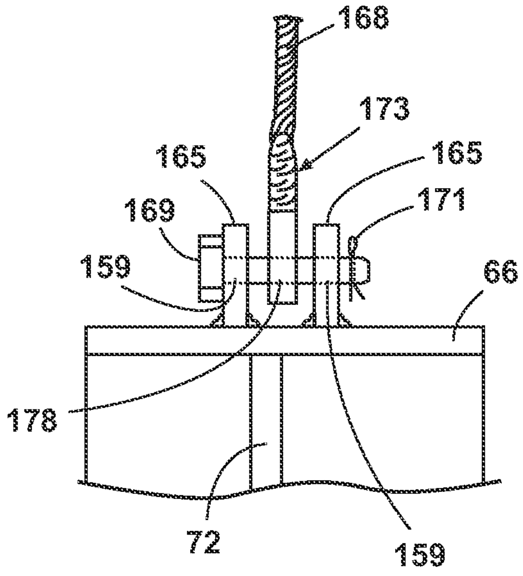
FIG. 8E is a partial top view of an alternate carriage according to the invention.
Figure 8D:
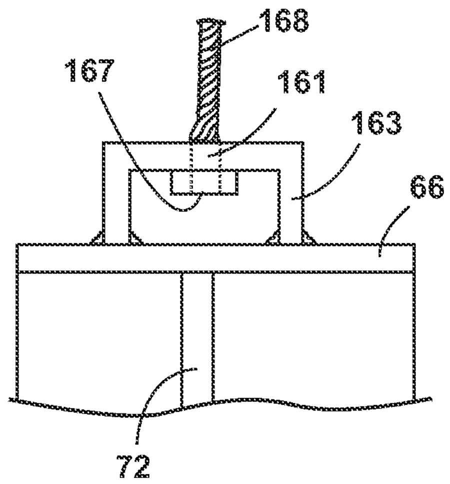
FIG. 8D is a partial top view of an alternate carriage according to the invention.
Figure 9:
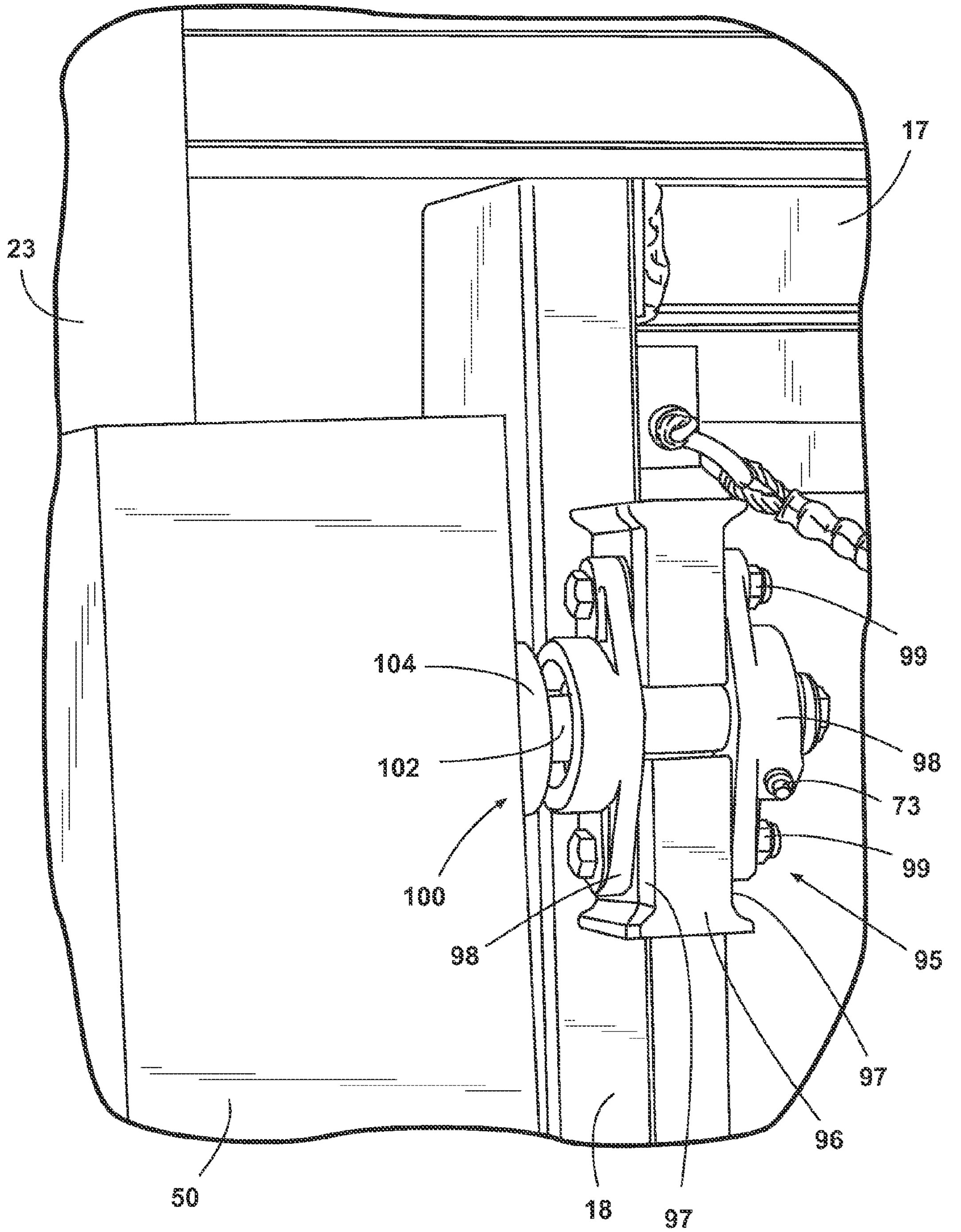
FIG. 9 is a partial view looking up showing a cam follower pivotally mounted to the tilt-up door with the cam follower engaging the cam surface.

In FIGS. 8B-8E and 16-18 other embodiments of pivotal mounting arrangements and operating mechanisms for a tilt-up door 10 for a building 20 are illustrated. Turning to FIGS. 8B-8E and 16-18, tilt-up door 10 can be pivotally mounted to a building 20 as described above with FIGS. 1-3 and 9-11. However, in the alternate embodiments of FIGS. 8B-8E and 16-18, carriages 160 can be operated by a single actuator 39 via cables 168 instead of hydraulic cylinders 40 as illustrated in FIG. 3. Carriage 160 can be similar to carriage or push block 60 shown in FIGS. 8 and 8A except that piston connector 74 on end plate 68 (FIGS. 8 and 8A) can be replaced by cable bracket. In the embodiment of FIGS. 8B and 8C carriage 160 can have a cable bracket 162 on opposite end plate 66. Cable bracket 162 can have an opening, not visible, to receive clevis pin 166 to attach clevis 164 to cable bracket 162. The remaining elements of carriage 160 can be the same as the corresponding elements of carriage or push block 60 and are identified with the same reference numeral as in FIGS. 8 and 8A and will not be described again. A steel cable 168 can be connected to carriage 160 with a clevis 164 connecting loop 170 in cable 168 to cable bracket 162 with a clevis pin 166. While loop 170 is shown without a thimble clip those skilled in the art will understand that a thimble clip can be used in forming loop 170 if desired to strengthen and extend the working life of loop 170. Loop 170 as shown in FIGS. 8B and 8C can be formed with a loop crimp 172. Those skilled in the art will understand that instead of a loop crimp 172 a loop sleeve or rope clip can be used to form loop 170 if desired. Referring to FIGS. 8D and 8E alternate arrangements to connect cable 168 to a carriage 160 can be seen. FIGS. 8D and 8E are partial views of a carriage 160 that can be similar to carriage 60 as shown in FIG. 8B except for an alternate cable bracket and cable connecting mechanism. Other than the differing cable connection arrangements the embodiments illustrated in FIGS. 8D and 8E carriage 160 can be similar to carriage 160 illustrated in FIGS. 8B and 8C. In the embodiment of FIG. 8D, a generally U-shaped cable bracket 163 can be connected to end plate 66 and can include an hole 161 to allow cable 168 to pass through cable bracket 163 so that cable termination 167 can secure cable 168 to carriage 160. Cable termination 167 can be any well known wire rope termination and can be crimped or otherwise affixed to cable 168. Cable bracket 163 can be welded to end plate 66 as illustrated, or alternately can be provided with flanges and attached to end plate 66 with suitable fasteners as is well known in the art. In the embodiment of FIG. 8E, a pair of spaced cable brackets 165 can be connected to end plate 66 of carriage 160 that can be similar to cable bracket 162 and can have a hole 159 arranged to receive pin 169. Cable 168 can have a connector 173 affixed to the end of cable 168. Connector 173, like cable brackets 165 can have a hole 178 to receive pin 169 to attach cable 168 to carriage 160. Wire rope cable connectors 173 are well known in the art, as are methods of attaching such connectors to wire rope cables. Thus, carriages 160 in the embodiments illustrated in FIGS. 8B-8E can be lifted by cable as illustrated in the embodiments of FIGS. 15-18.

Figure 15:
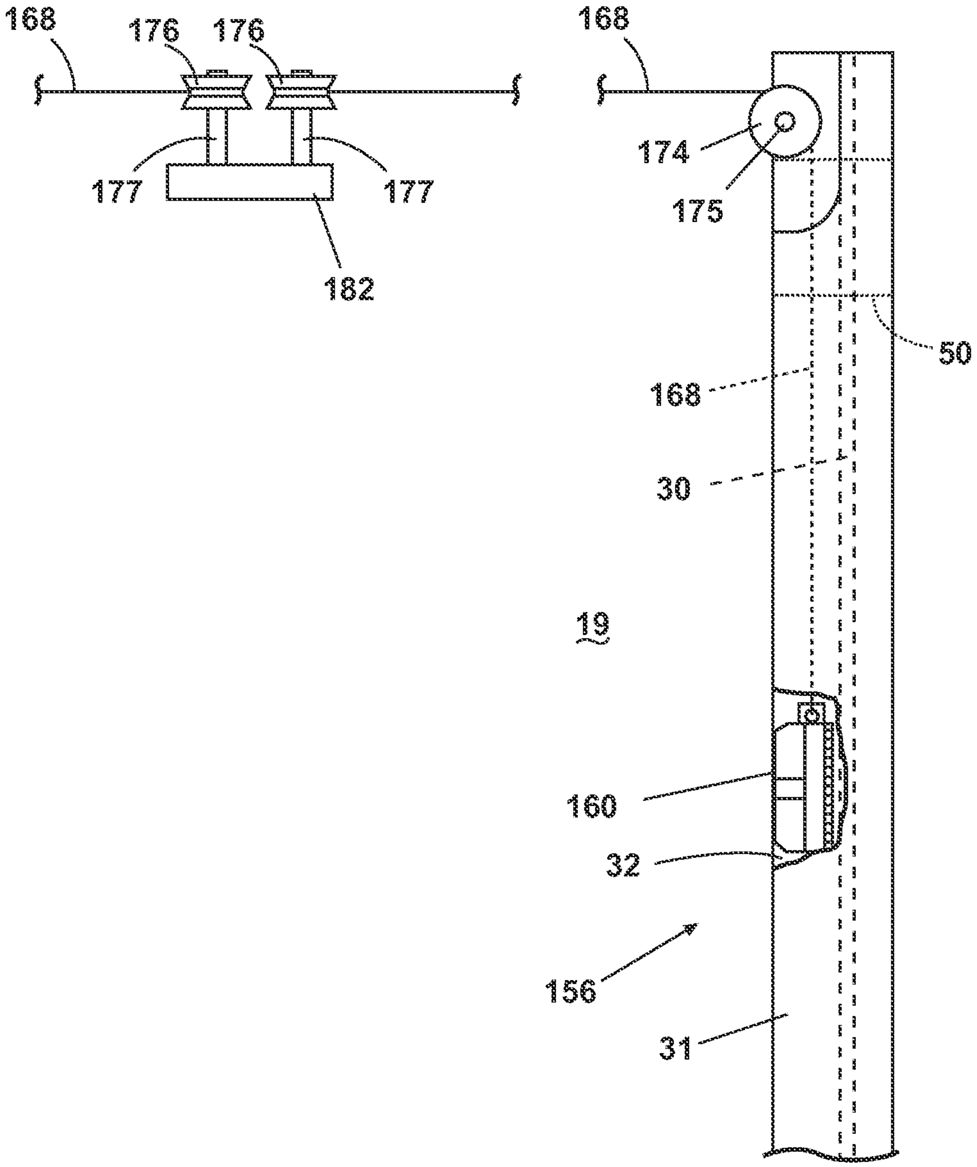
FIG. 15 is a partial schematic front view looking into the door opening of a building having a tilt-up door according to the invention with the door removed showing an alternate U-shaped channel arrangement that can be used with the alternate carriage illustrated in FIGS. 8B-8E.
Figure 16:
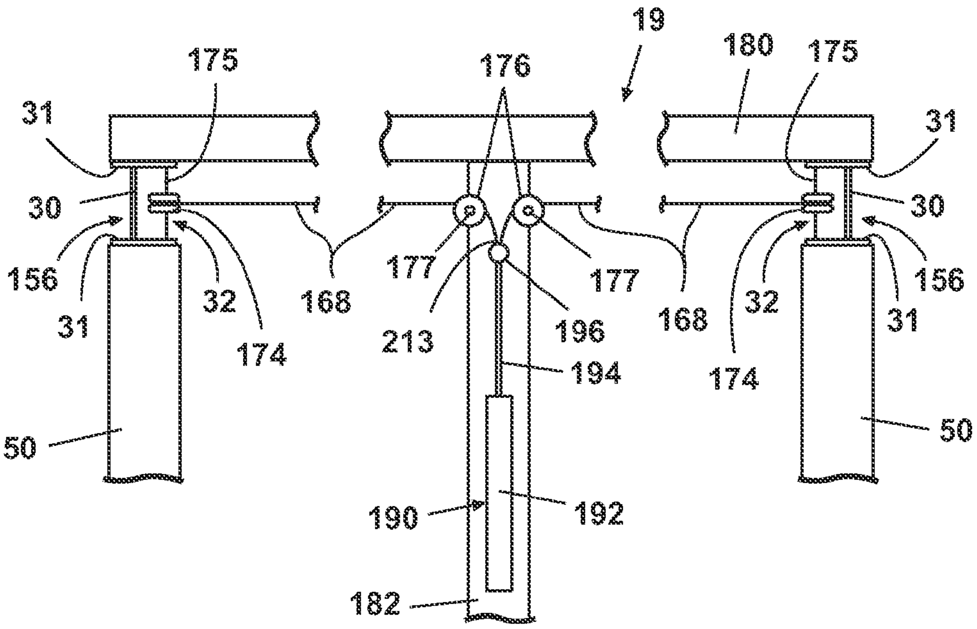
FIG. 16 is a partial schematic top view showing an alternate actuator that can be used with the U-shaped channel arrangement of FIG. 15.
Figure 16A:
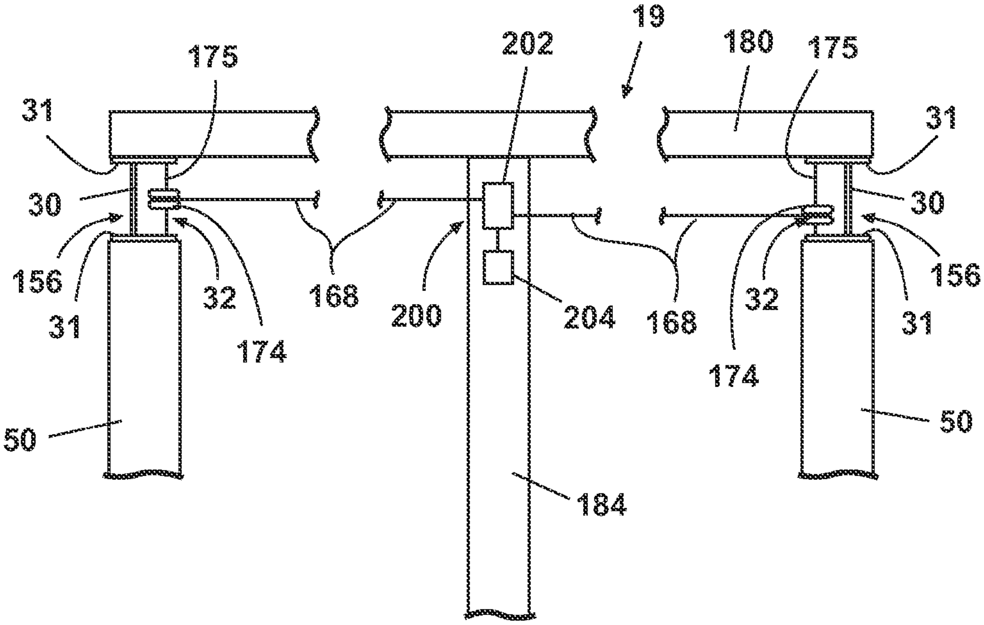
FIG. 16A is a partial schematic top view illustrating the alternate actuator that can be used with U-shaped channel arrangement illustrated in FIG. 15.

Turning to FIGS. 15 and 16, a portion of an I-beam 156 that can be similar to I-beam 22 in the embodiment of FIGS. 1-11 and 13 can be seen looking in through door opening 19 in building 20 having a tilt-up door 10 as described above, but not shown in FIGS. 15, 16 and 16A. As in the embodiment illustrated in FIGS. 1-11 and 13, an I-beam 156 can be provided on both sides of door opening 19 and can have flanges 31 forming a channel 32 as described above. Portions of flange 31 in FIG. 15 are cut away to show carriage 160 in channel 32 and pulley 174. I-beam 156 can be part of a building framework 28 and can be an I-beam or other structure forming a U-shaped channel 32 all as described above in connection with FIGS. 1-11 and 13. In the embodiment of FIGS. 15, 16 and 16A, I-beams 156 can extend above track 50 and can support a pulley 174 on shaft 175. Pulley shaft 175 can be supported by I-beam 156 or can be supported by a bracket mounted to I-beam 156 as will be obvious to one having ordinary skill in the art. Pulley 174 can be positioned above track 50 so that cable 168 will not interfere with the top edge 36 of tilt-up door 10, not shown in FIGS. 15, 16 and 16A, as tilt-up door 10 is opened and closed as described above. A building truss 180 is illustrated spanning I-beams 156 in FIGS. 16 and 16A although the building structure or roof trusses, not shown, may include different elements to support the upper ends of I-beams 156, or the alternate arrangement described above in conjunction with FIG. 12 can be used.

Turning to FIGS. 16 and 16A embodiments of an actuator 39 for the alternate embodiment operating mechanisms will be described. As illustrated in FIG. 16, cables 168 can pass over pulleys 174 associated with I-beams 156 toward the center of door opening 19. A building truss 182 can be provided extending into the building from door opening 19 adjacent and above door opening 19 and can provide support for an actuator 39. In the embodiment of FIG. 16 the actuator 39 can be a linear actuator 190 that can have a fixed portion 192 that can be connected to building truss 182 and can have a movable portion 194. Movable portion 194 can have a cable connector 196. In the embodiment illustrated in FIG. 16 linear actuator 190 can be a hydraulic cylinder 192 having a piston 194. Cables 168 can pass over pulleys 176 and can be connected to cable connector 196 in a manner similar to the cable connection to carriage 160 as shown in FIGS. 8B-8E, or other well known cable connections. Cables 168 can include a turnbuckle, not shown, to permit ready adjustment of the length of cables 168 for the tilt-up door 10 so that the carriages 160 supporting opposite sides of tilt-up door 10 move together when linear actuator 190 is activated. Linear actuator 190 can be a hydraulic cylinder as shown or can be a rack and pinion, a power screw, ball screw linear actuator or other well known linear actuator that can have a suitable electric motor to operate the linear actuator, as is well known in the art, to draw cables 168 upward to lift or lower carriages 160 to move tilt-up door 10. While linear actuator 190 is illustrated in FIG. 16 having fixed end 192 positioned away from the door opening 19 so that the movable portion 194 is extended when tilt-up door 10 is closed, those skilled in the art will understand that, if desired, linear actuator 190 can be repositioned in the opposite direction so that movable portion is extended to open tilt-up door 10 rather than be retracted. In the event linear actuator is repositioned in the opposite direction the connection for cables 168 can be arranged to space cables 168 from linear actuator 190 so the cables 168 can pass along side linear actuator 190. A suitable control circuit, not shown, can be provided to operate the linear actuator can be provided on a control panel that can be similar to control panel 130 as described in conjunction with the embodiment of FIGS. 1-11 and 13. A hydraulic cylinder linear actuator can have a hydraulic circuit 132 and control similar to that illustrated in FIG. 14, again as is well known in the art. An electrically operated linear actuator can be provided with an electric release brake to prevent tilt-up door 10 from closing in the event of interruption of electric power to the control circuit similar to the operation of the holding valves 140 in the hydraulically operated embodiments.

In the actuator 39 embodiment illustrated in FIG. 16A a winch 200 can be mounted on a building truss 184 that can be connected to the framework of building 20. Building truss 184 can be positioned above and adjacent door opening 19 in a position where it will not interfere with tilt-up door 10, not shown in FIG. 16A, as tilt-up door 10 is opened and closed as described above. Winch 200 can have a cable drum 202 and an electric motor 204. Cables 168 can be attached to opposite ends of cable drum 202 so that as cable drum 202 is rotated by electric motor 204 cables 168 are wound on cable drum 202 thus lifting carriages 160, and accordingly tilt-up door 10, or unwound from cable drum 202 thus lowering carriages 160, and accordingly tilt-up door 10. Winch motor 204 can have a control circuit, not shown, that can allow an operator to activate winch motor 204 to open or close tilt-up door 10. Winch 200 can be provided with a suitable electric release brake to prevent the tilt-up door 10 from inadvertently closing in the event of loss of electric power to the control circuit, not shown, or to the winch 200. Alternately, winch 200 can be a hydraulic winch as are well known in the art and can be powered by a hydraulic circuit and control that can be similar to hydraulic circuit 132 illustrated in FIG. 14.

Figure 17A:
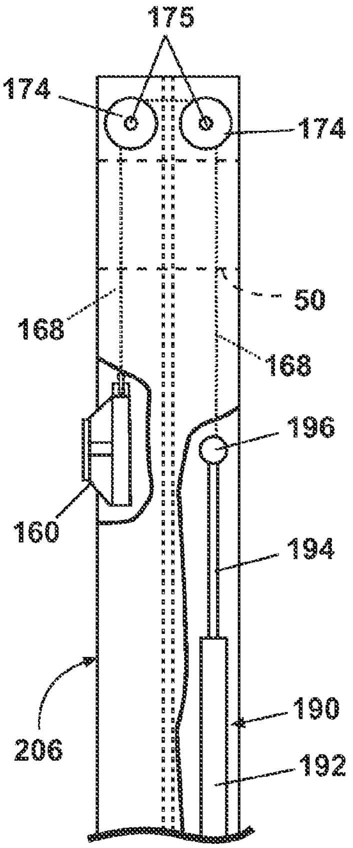
FIG. 17A is a partial schematic front view looking into the door opening of a building having a tilt-up door according to the invention with the door removed showing an alternate U-shaped channel arrangement that can be used with an alternate carriage as illustrated in FIGS. 8B-8E.
Figure 17B:
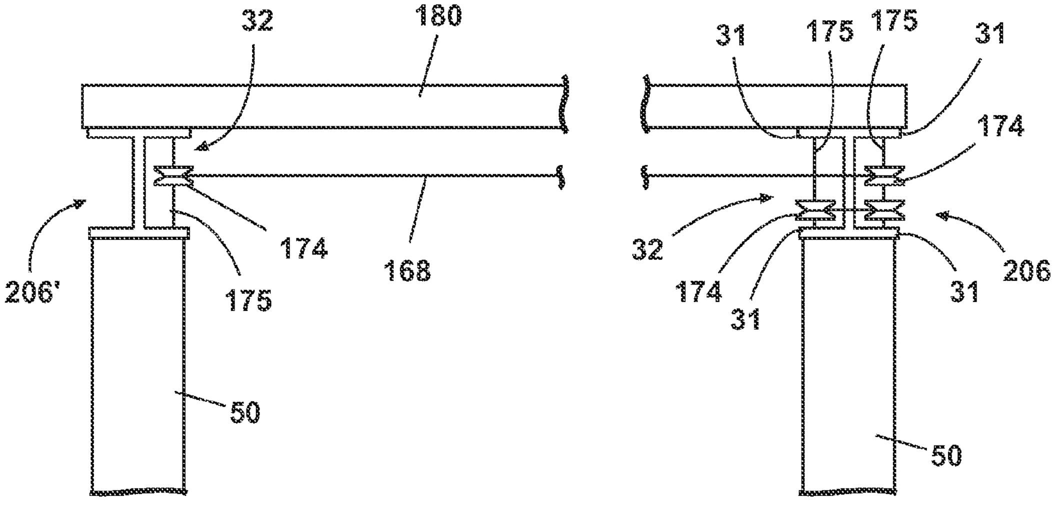
FIG. 17B is a partial schematic top view showing the alternate U-shaped channel arrangement of FIG. 17A.

Turning to FIGS. 17A and 17B another cable operated embodiment can be seen. A portion of an I-beam 206 that can be similar to I-beam 22 in the embodiment of FIGS. 1-11 and 13 can be seen looking in through door opening 19 in building 20 having a tilt-up door 10 as described above, but not shown in FIGS. 17A and 17B. As with I-beam 22 in the embodiment illustrated in FIGS. 1-11 and 13, an I-beam 206 can be provided on opposite sides of door opening 19 and can have a web 30 and flanges 31 forming a channel 32 as described above. Portions of flange 31 in FIG. 17A are cut away to show carriage 160 in channel 32. I-beam 206 can be part of a building framework 28 and can be an I-beam or other structure forming a U-shaped channel 32 all as described above in connection with FIGS. 1-11 and 13. In the embodiment of FIGS. 17A and 17B, I-beams 206 can extend above track 50 and can support pulleys 174 on shafts 175. Pulley shafts 175 can be supported by I-beam 206 or can be supported by a bracket mounted to I-beam 206 as will be obvious to one having ordinary skill in the art. Pulleys 174 can be positioned above track 50 to avoid cables 168 interfering with the top edge 36 of tilt-up door 10, not shown in FIGS. 17A and 17B, as tilt-up door 10 is opened and closed as described above. The right hand I-beam 206 in FIG. 17A can include a first cable 168 connected to carriage 160 movably carried in I-beam 206 that passes over two pulleys 174 mounted at the top of column 206 and down to linear actuator 190. The left hand I-beam 206' can have a single pulley 174 carried on shaft 175 at the top of I-beam 206 to carry a cable 168 from the carriage 160, not shown in FIG. 17B, but similar to that shown in FIG. 17A, movably carried in I-beam 206' across door opening 19 to I-beam 206. A building truss 180 is illustrated spanning I-beams 206 in FIG. 17B although the building structure or roof trusses, not shown, may include different elements to support the upper ends of I-beams 206, or the alternate arrangement described above in conjunction with FIG. 12 can be used. The I-beam 206 (on the right hand side of FIG. 17B) can include an actuator 190 that can be seen in the cut-out portion of I-beam 206. Linear actuator 190 can be a hydraulic cylinder or other linear actuator as described above in connection with FIG. 16 and can be provided with a suitable control, again as described above in connection with FIG. 16. Fixed portion 192 of linear actuator 190 can be attached to I-beam 206 similar to the mounting arrangement described above in connection with FIG. 4. The distal end of movable portion 194 of linear actuator 190 can have a suitable cable bracket 196 to connect cables 168 from I-beams 206 and 206' to linear actuator 190.

Figure 18:
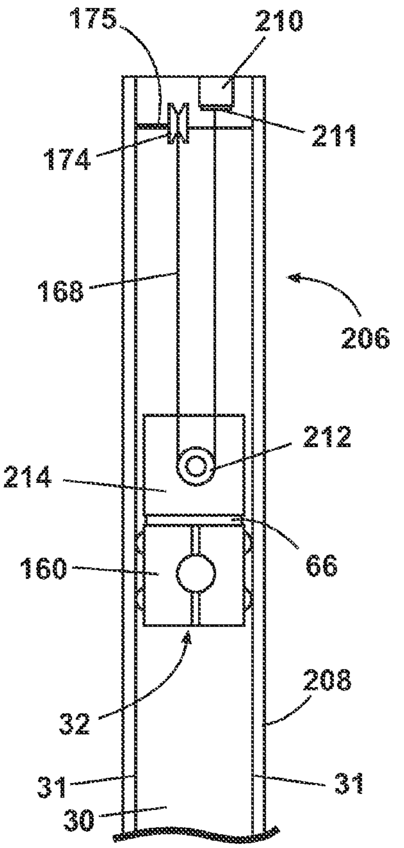
FIG. 18 is a partial schematic side view looking at the edge of a door opening of a building having a tilt-up door according to the invention with the door removed showing an alternate U-shaped channel arrangement that can be used with an alternate carriage as illustrated in FIGS. 8B-8E.

Turning to FIG. 18 an alternate I-beam or U-shaped column can be seen in partial schematic form. A portion of an I-beam 208 that can be similar to I-beam 22 in the embodiment of FIGS. 1-11 and 13 can be seen looking at door opening 19 in building 20 having a tilt-up door 10 as described above, but not shown in FIGS. 17A and 17B. As with I-beam 22 in the embodiment illustrated in FIGS. 1-11 and 13. An I-beam 208 can be provided on opposite sides of door opening 19 and can have a web 30 and flanges 31 forming a generally U-shaped channel 32 as described above. The embodiment of FIG. 18 can employ a cable system and a block or pulley carried by movable carriage 160 that can be used to reduce the force required to open a tilt-up door 10. Such an arrangement can be advantageous in the case of large tilt-up doors by providing a two-time mechanical advantage to facilitate lifting the tilt-up door although the opening time can be increased depending on the speed of the actuator 39. While a two to one mechanical advantage arrangement is illustrated in FIG. 18, those skilled in the art will understand that a three to one or greater mechanical advantage arrangement can be employed as desired.

As in the case of the embodiments described above, an I-beam 208 can be located on both sides of door opening 19, not shown. Carriage 160 can have a block bracket 214 connected to end plate 66 that can support block or pulley 212. I-beam 208 can have a cable anchor 210 adjacent the top end of I-beam 208 and can be located so that anchor 210 is above block 212 when tilt-up door 10, not shown in FIG. 18, is fully opened. The first end 211 of cable 168 can be secured to anchor 210 and can pass over block 212 and then to pulley 174 mounted on shaft 175 adjacent to top of I-beam 208. Cables 168 from the opposite sides of the door opening 19 can be connected at their second end 213 as illustrated in of the embodiment illustrated in FIG. 16A to an electric or hydraulic winch 200 as desired.

To open tilt-up door 10 from the closed position to the open position an actuator 39 such as illustrated in FIGS. 16, 16A, 17A and 18 can be activated by a control circuit as described above to draw cables 168 away from door opening 19 thus causing cables 168 to lift carriages 160 pivotally attached to opposite sides of tilt-up door 10 similar to the operation of hydraulic cylinders 40 as described above in detail. To close the tilt-up door 10 actuator 39 can be activated to allow the cables 168 to extend toward the door opening 19 thus allowing cables 168 to lower carriages 160 pivotally connected to opposite sides of tilt-up door 10. Thus, in the embodiment of FIGS. 8B-8E, 15, 16, 16A, 17A, 17B and 18 a single actuator 39 can lift and lower carriages 160 by cables 168 while in the embodiment of FIGS. 3, 4, 5-7, 8 and 8A carriages or push blocks 60 are pushed upward and lowered by an actuator 39 comprising two hydraulic cylinders 40. Carriages 60 and 160 can operate in the channel formed by the respective I-beams or columns in conjunction with the cam surface(s) in tracks 50 in a similar manner to lift and tilt door 10 to the open position and return tilt-up door 10 to the closed position.

Figure 19A:
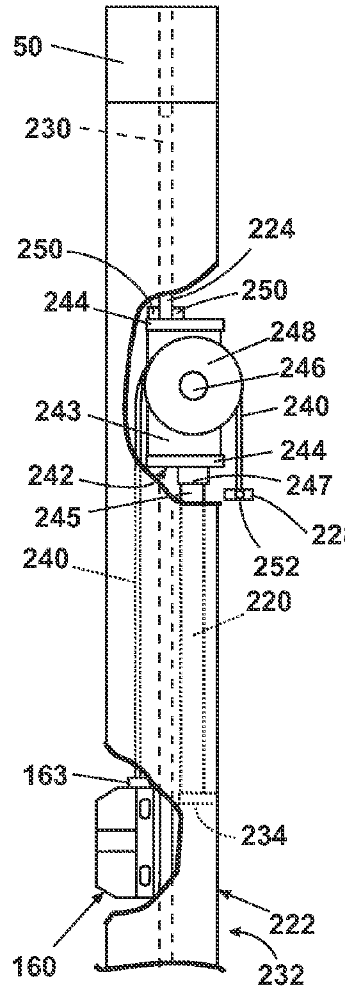
FIG. 19A is a partial schematic front view of an alternate U-shaped channel looking into the door opening of a building having a tilt-up door according to the invention with the door removed showing an alternate linear actuating mechanism that can be used with an alternate carriage as illustrated in FIGS. 8B-8E.
Figure 19B:
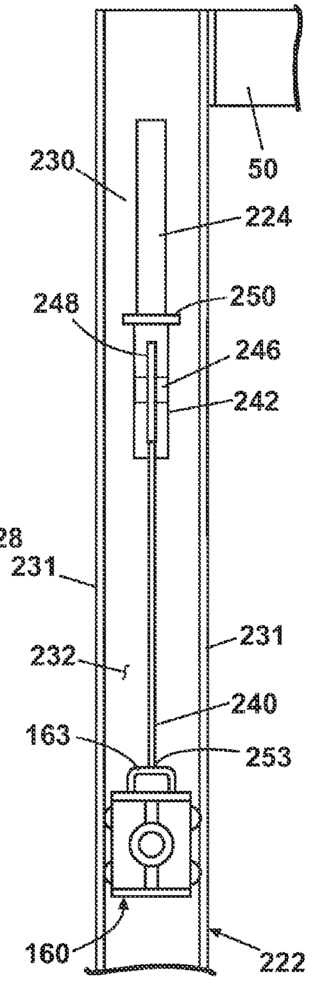
FIG. 19B is a partial schematic side view of the alternate U-shaped channel of FIG. 19A showing the alternate carriage.
Figure 19C:
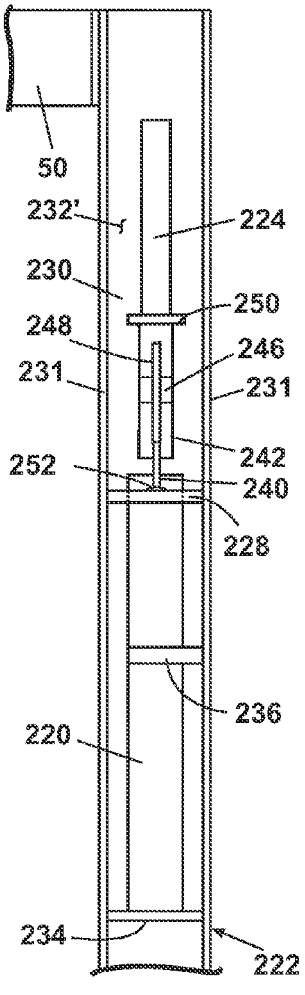
FIG. 19C is a partial schematic side view of the alternate U-shaped channel and alternate linear actuating mechanism of FIG. 19A showing the alternate linear actuating mechanism.

Turning to FIGS. 19A-19D an alternate I-beam or U-shaped channel and alternate actuating mechanism can be seen. In the embodiment of FIGS. 19A-19D a linear actuator 220 can be mounted in I-beam or U-shaped channel 222 that can be similar to I-beam 22 described above. As in the embodiment illustrated in FIGS. 1-11 and 13, an I-beam or U-shaped channel member 222 can be provided on both sides of a door opening 19, not shown, and can have a web 230 and flanges 231 forming a generally U-shaped channel 232. Portions of flanges 231 are cut away to show carriage 160 and pulley block 242 in channels 232 and 232'. In the embodiment of FIGS. 19A-19D instead of a two to one or greater mechanical advantage as illustrated in the embodiment of FIG. 18, the alternate actuating mechanism can be a one to two mechanical advantage that, while requiring generally two times the force to lift the door 10, provides carriage travel that is two times the travel of the linear actuator. A one to two mechanical advantage arrangement as illustrated in FIGS. 19A-19D can be desirable for use with tilt-up doors to reduce the required travel of the linear actuator. Turning to FIGS. 19A and 19C, a linear actuator 220 can be positioned in channel 232' on one side of I-beam 222 adjacent the web 230 opposite the vertical channel 232 facing door opening 19 and mounted on an actuator mounting bracket 234 at one end and can include an actuator securing bracket 236 adjacent the upper end of linear actuator 220 similar to the hydraulic cylinder mounting arrangement described above in connection with FIG. 4. An anchor bracket 228 can be attached to I-beam 222 adjacent the top of linear actuator 220 and can be arranged for connection of a first end 252 of flexible link 240, that can be a flat chain or cable, to I-beam 222 as is well known in the art. Mounting bracket 234 and actuator securing bracket 236 can be connected to I-beam 222 as described above in connection with FIG. 4. I-beam 222 can have a web 230 that can include a slot 224 extending from adjacent the top of linear actuator 220 to adjacent track 50 that can be secured to I-beam 222 adjacent the top of I-beam 222.

Figure 19D:
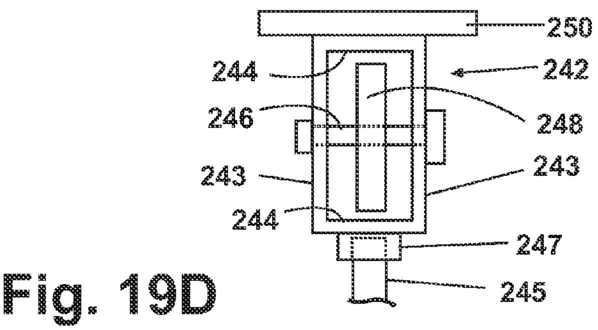
FIG. 19D is a partial schematic view of the pulley block for use with the alternate linear actuating mechanism of FIG. 19A removed from the U-shaped channel.

Turning to FIGS. 19A and 19B, U-shaped channel 232 of I-beam 222 facing the door opening 19 can be seen with carriage 160 that can be similar to carriage 160 illustrated in FIG. 8D and can include a cable bracket 163 that can be arranged for connection of a second end 253 of flexible link 240 to carriage 160 as is well known in the art. Carriage 160 can be similar to carriage 160 described above and to carriage 60 described above except for flexible link connection apparatus and will not be described in further detail. Turning to FIGS. 19A and 19D, a pulley block 242 can be slidably carried in slot 224 and can have a connector 247 that can be connected to the distal end 245 of linear actuator 220 similar to the arrangement illustrated in FIGS. 8A and 8B. Pulley block 242 can be a generally rectangular hollow box having sides 243 and ends 244 dimensioned to be slidably carried in slot 242 and can have an axle 246 mounted to sides 243 to rotatably carry a pulley 248 that can be arranged for use with a flexible link 240 as desired. Connector 247 can be carried by the bottom end 244 as illustrated in FIG. 19D. Pulley blocks 242 can also have a guide bar or flange 250 that can be attached to pulley block 242 to the top end wall 244 or other desired part of pulley block 242 and can be positioned to slide on one surface of web 230. Guide bar 250 can have a low friction surface that can be similar to low friction surface or pad 90 on carriage 60. If desired a guide bar or flange 250 can be provided for pulley block 242 to engage both sides of web 230 as illustrated in FIG. 19A or on one side of web 230. If guide bars or flanges 250 are provided to engage both sides of web 230, one or both of the guide bars or flanges 250 can be removably mounted to pulley block 242 to facilitate assembly and removal of pulley block 242 to beam 222. Guide bar(s) 250 can help maintain pulley block 242 aligned in slot 244 as linear actuator 220 moves pulley block 242 up and down to lift and lower carriage 160 and accordingly door 10, not shown in FIGS. 19A-19D. Thus, in operation linear actuators 220 carried by the I-beams 222 on opposite sides of door 10, not shown, can be actuated to cause the linear actuators 220 to lift pulley blocks 242 in slots 224 in I-beams 222. As pulley blocks 242 are lifted in slots 224, carriages 160 are lifted twice as far in channels 232 as the movement of linear actuator 220 by flexible links 240. Linear actuators 220 can be hydraulic cylinders as illustrated in FIGS. 19A-19C connected to a hydraulic circuit similar to the hydraulic circuit illustrated in FIG. 14, or can be other linear actuators as described above in connection with FIG. 16. Thus, in the embodiment of FIGS. 19A-19D the linear actuators 220 can be connected to carriages 160 by a flexible link 240 arranged to provide a one to two mechanical advantage that provides a carriage travel that is two times the linear actuator travel.

The invention should not be understood to be limited to the use of hydraulic cylinders as illustrated in the embodiments of FIGS. 3, 4, 5-7, 8, 8A and 19A-19D the linear actuators of the embodiments of FIGS. 16, 17A and 18 or the winch embodiment of FIG. 16A, but can be used in connection with any desired actuator 39 to move carriage or push blocks 60 and 160 vertically in channels 32, 232 to move a tilt-up door 10 from the closed position of FIG. 1 to the open position of FIG. 3. Further, a linear actuator can be positioned at other locations adjacent door opening including, but not limited to, a wall of building 20 if desired.

While the invention has been specifically described in connection with certain specific embodiments thereof, it is to be understood that this is by way of illustration and not of limitation.

I claim:

1. A tilt-up door system for a building having an opening comprising:

a door frame comprising a pair of vertically juxtaposed members defining a vertical track;

at least one first cam surface extending generally laterally from the vertical track at an upper portion thereof, wherein the at least one first cam surface has a first steep inclined segment, a second inclined segment and a third descending segment;

a door sized to span the opening and pivotally coupled with at least one roller disposed within the vertical track, and at least one cam follower extending laterally from an upper portion of the door in register with the at least one first cam surface;

whereby when the door is placed in alignment with the opening in a closed, lowered position, the at least one roller is disposed within the vertical track and the at least one cam follower is located adjacent to the at least one first cam surface, and an upwardly-directed motive force acts upon the door, the at least one cam follower comes into abutment with the first steep inclined segment of the at least one first cam surface which moves the door generally vertically, then into abutment with the second inclined segment of the at least one first cam surface which rotates the upper portion of the door inwardly, and then into abutment with the third descending segment of the at least one first cam surface to bring the door into an opened, raised position.

2. The tilt-up door system of claim 1 further comprising a second cam surface, vertically spaced beneath the first steep inclined segment, comprising a second initial ramped segment, whereby the at least one cam follower can ride against the second initial ramped segment as the door moves from and returns to the closed, lowered position to prevent the door from unintentionally opening prior to the door being opened to an extent such that a sufficient cantilever load of the door maintains contact of the at least one cam follower against the at least one first cam surface.

3. The tilt-up door system of claim 2 further comprising a third cam surface, vertically spaced beneath the third descending segment of the at least one first cam surface, comprising a terminal ramped segment, whereby the at least one cam follower is prevented from unintended oscillating movement with respect to the at least one first cam surface as the at least one cam follower extends along the third descending segment during movement toward or from the opened, raised position.

4. The tilt-up door system of claim 3 wherein the second cam surface and the third cam surface are integrally coupled with a fourth cam surface vertically spaced beneath the at least one first cam surface.

5. The tilt-up door system of claim 1 further comprising a second cam surface parallel to and vertically spaced beneath the at least one first cam surface.

6. The tilt-up door system of claim 5 wherein the second cam surface is vertically spaced beneath the at least one first cam surface such that the at least one cam follower is simultaneously in contact with the at least one first cam surface and the second cam surface.

7. The tilt-up door system of claim 1 further comprising a motor operably coupled with the door and the door frame to provide the motive force to move the door with respect to the door frame.

8. The tilt-up door system of claim 1 wherein the door has a width dimension that is at least two times greater than a height dimension of the door.

9. The tilt-up door system of claim 1 further comprising a truss extending horizontally across an exterior surface of the door.

10. The tilt-up door of claim 1 wherein a terminal end of the third descending segment of the at least one first cam surface extends vertically lower than an initial end of the second inclined segment.

* * * * *